(12) United States Patent
Xu

(10) Patent No.: US 10,966,377 B2
(45) Date of Patent: Apr. 6, 2021

(54) INTELLIGENT GROWING MANAGEMENT METHOD AND INTELLIGENT GROWING DEVICE

(71) Applicant: Jixiang Xu, Beijing (CN)

(72) Inventor: Jixiang Xu, Beijing (CN)

( * ) Notice: Subject to any disclaimer, the term of this patent is extended or adjusted under 35 U.S.C. 154(b) by 566 days.

(21) Appl. No.: 15/576,899

(22) PCT Filed: May 23, 2016

(86) PCT No.: PCT/CN2016/082958
§ 371 (c)(1),
(2) Date: Jan. 18, 2018

(87) PCT Pub. No.: WO2016/188384
PCT Pub. Date: Dec. 1, 2016

(65) Prior Publication Data
US 2018/0146626 A1 May 31, 2018

(30) Foreign Application Priority Data
May 26, 2015 (CN) .......................... 201510277815.9

(51) Int. Cl.
*A01G 7/06* (2006.01)
*G06N 20/00* (2019.01)
(Continued)

(52) U.S. Cl.
CPC .............. *A01G 7/06* (2013.01); *A01C 21/005* (2013.01); *A01C 21/007* (2013.01); *A01G 7/02* (2013.01);
(Continued)

(58) Field of Classification Search
CPC ... A01G 7/06; A01G 7/00; A01G 7/02; A01G 7/045; A01G 7/04; A01G 9/20;
(Continued)

(56) References Cited

U.S. PATENT DOCUMENTS

| 8,056,284 B2 | 11/2011 | He |
| 2007/0289207 A1 | 12/2007 | May et al. |
| 2013/0311218 A1 | 11/2013 | Maeda et al. |

FOREIGN PATENT DOCUMENTS

| CN | 102014165 A | 4/2011 |
| CN | 103336517 A | 10/2013 |

(Continued)

OTHER PUBLICATIONS

First Office Action issued by Japan Patent Office dated Dec. 23, 2019 for related Japanese Patent Application No. 2018-513711.
(Continued)

*Primary Examiner* — Christopher J. Novosad
(74) *Attorney, Agent, or Firm* — Enshan Hong; VLP Law Group LLP

(57) ABSTRACT

An intelligent planting apparatus an intelligent planting management method controls planting processes of plants in a plurality of planting devices within different environments, and includes data collection step, classification-marking step, and regulation step. Collected data comprise: plants' planting information, environment information of planting devices, planting condition information and plant features. Classifying the collected data, scoring and comparing the plant features in each planting devices according to preset conditions under same category, and marking and storing respective planting condition information of the planting device with high planting feature score in a plant growing cycle. Comparing the current planting condition information with the stored marked planting condition information according to planting and environment information of respective planting device. If difference therebetween exceeds threshold, a regulation data is generated according to the stored marked planting condition information and the (Continued)

current planting condition information to regulate planting condition of respective planting device.

29 Claims, 10 Drawing Sheets

(51) Int. Cl.
*G06Q 10/06* (2012.01)
*G06Q 50/02* (2012.01)
*A01C 21/00* (2006.01)
*A01G 7/02* (2006.01)
*A01G 7/04* (2006.01)
*A01G 9/20* (2006.01)
*A01G 25/06* (2006.01)
*G06N 7/00* (2006.01)
*A01G 25/16* (2006.01)

(52) U.S. Cl.
CPC .............. *A01G 7/045* (2013.01); *A01G 9/20* (2013.01); *A01G 25/165* (2013.01); *A01G 25/167* (2013.01); *G06N 7/00* (2013.01); *G06N 20/00* (2019.01); *G06Q 10/06* (2013.01); *G06Q 50/02* (2013.01); *Y02P 60/14* (2015.11)

(58) Field of Classification Search
CPC ........ A01G 9/00; A01G 25/165; A01G 25/16; A01G 25/00; A01G 25/167; G06N 20/00; G06N 7/00; A01C 21/005; A01C 21/00; A01C 21/007; G06Q 10/06; G06Q 10/00; G06Q 50/02; G06Q 50/00; Y02P 60/146; Y02P 60/14; Y02P 60/10; Y02P 60/00
See application file for complete search history.

(56) References Cited

FOREIGN PATENT DOCUMENTS

| CN | 104186186 A | 12/2014 |
|---|---|---|
| CN | 104866970 A | 8/2015 |
| JP | 2012-155432 A | 8/2012 |
| JP | 2013-165687 A | 8/2013 |
| JP | 2014-193174 A | 10/2014 |
| JP | 2015-72506 A | 4/2015 |

OTHER PUBLICATIONS

Examination Report issued by Australian Patent Office dated Jan. 29, 2019 for related Australian standard Patent Application No. 2016266460.
Examination Report issued by Canadian Patent Office dated Oct. 1, 2018 for related Canadian Patent Application No. 2,987,319.
Le, W.S.; Alchanatis, V.; Yang, C.; Hirafuji, M.; Moshou, D.; Li, C., "Sensing technologies for precision specialty crop production", Computers and Electronics in Agriculture, vol. 74, Issue 1, pp. 2-33, ISSN:0168-1699; URL: <https://naldc.nal.usda.gov/download/46603/PDF>, Oct. 1, 2010 (Oct. 1, 2010).
Second Office Action issued by Canadian Patent Office dated Sep. 6, 2019 for related Canadian Patent Application No. 2987319.
Third Office Action issued by Canadian Patent Office dated Nov. 16, 2020 for related Canadian Patent Application No. 2987319.
Extended European Search Report issued by EPO dated Apr. 9, 2019 for related European Patent Application No. 16799272.6.
European First Office Action issued by EPO dated Nov. 23, 2020 for related European Patent Application No. 16799272.6.
McCarthy A C et al: VARiwi se: A general-purpose adaptive control simulation framework for spatially and temporally varied irrigation at sub-field scale11 , Computers and Electronics in Agriculture, Elsevier, Amsterdam, NL, vol. 70, No. 1, Jan. 1, 2010 (Jan. 1, 2010), pp. 117-128, XP026815063, ISSN: 0168-1699.
Veeramanikandasamy T et al: "Remote monitoring and closed loop control system for social modernization in agricultural system using GSM and Zigbee technology", 2014 International Conference on Advances in Electrical Engineering (ICAEE), IEEE, Jan. 9, 2014 (Jan. 9, 2014), pp. 1-4, XP032607827, DOI: 10.1109/ICAEE.2014. 6838438.
Sathish Kannan Ket Al: "Online farming based on embedded systems and wireless sensor networks", 2013 International Conference on Computation of Power, Energy, Information and Communication (ICCPEIC), IEEE, Apr. 17, 2013 (Apr. 17, 2013), pp. 71-74, XP032580785, DOI: 10.1109/ICCPEIC.2013.6778501.

INTELLIGENT GROWING MANAGEMENT METHOD AND INTELLIGENT GROWING DEVICE

TECHNICAL FIELD

The present invention relates to an intelligent planting method and an intelligent planting apparatus, and more particularly, relates to an intelligent planting management method and an intelligent planting apparatus based on Internet.

PRIOR ART

The intelligent management of plant planting has been a hot topic in the field of agriculture, for which people have made many technological improvements and attempts.

The most common intelligent planting is an automatic watering system, serving independent users. Since there is no judgment based on the specific plant species (water-born plants or drought plants), the planting environment (in the south or the north, the specific daylighting conditions, etc.), the amount of watering and the time interval are based on rough estimation.

Chinese patent application publication CN102550371A sets forth an automatic irrigation control system and method for a cell or a villa based on the Internet of Things technology, and is composed of a control system, a regional node, a soil temperature and humidity sensor and a spray irrigation terminal. In this technology, the two indicators of temperature and humidity are monitored, and whether to water is decided according to the two indicators, i.e. temperature and humidity. However, the amount of watering in this technique is based on a preset threshold or manual control, irrespective of plant species and plant growth cycle. Only the soil moisture and temperature are considered for the environment.

Chinese patent application publication CN102868749A sets forth an Internet of Things (IoT) cloud service system and service process method for farming and feeding. Wherein, the planting data is collected, then it is sent to the cloud center, and finally to the user terminal. Cloud services include: agricultural information, policies and regulations, information releasing, information consulting, expert systems, agricultural products trading, agricultural products tracing, technical services, data mining, production monitoring, environmental monitoring and terminal management module. There exist the following problems in the technology: its main data perception and information release and acquisition services lack feedback control on the planting itself; information flows in one direction, that is, planting data is collected and sent to the user terminal; and users actively initiate requests when they need services access to information, which means that the system lacks active intelligent regulation capabilities; data-aware system does not take into account plant species, plant life cycle and other information.

Chinese Patent Application Publication CN13155839A sets forth an automatic watering and fertilization system, in which soil moisture and nutrient substance are detected and the system automatically waters or fertilizes the soil if the content of moisture and nutrients is reduced. However, this system simply irrigates and fertilizes based on pre-set values, regardless of plant species or plant life cycle, regarding the environment, only soil moisture and fertilizer levels are taken into account.

Chinese patent application publication CN104012375A sets forth an agricultural automatic sensing irrigation monitoring system, which automatically irrigates plants, considering the change of ambient temperature, humidity and season as a whole. It uses expert knowledge memory, which stores the appropriate growth environment parameters corresponding to different growth stages of different crops. In addition to monitoring soil moisture, this technique also sets forth monitoring plant physiological indicators (such as leaf temperature and stalk micro-variation). However, this technique focuses only on irrigation issues, regardless of the growth cycle in which the plants are located.

Chinese patent application publication CN104012376A sets forth an intelligent watering system, method and device based on ecological information of environment, which can precisely control watering according to the growth cycle of the flowers and grasses. However, this technique only focuses on watering issues.

Chinese patent application publication CN104216373A sets forth a household water management system based on an intelligent cloud for automatic watering of flowers and automatic adding of water storage. This technology sets forth a cloud intelligent remote control, wherein watering is controlled by a remote manually control terminal or by a manually-set water management plan. However, the amount of water is manually controlled or based on manually-set water management plan, regardless of the plant growth cycle, the environment and current soil temperature and humidity conditions. In addition, this technology focuses only on watering issues.

Chinese patent publication CN203490529U (application number CN201320629665) sets forth an intelligent planting apparatus based on Internet of Things. The document sets forth an intelligent planting apparatus for agricultural greenhouses, in which "intelligent planting can be carried out through the form of Internet of Things, which can be packaged, weighed, labeled, full planted and the source of the production information can be traced after the plant being mature". The intelligent planting refers to the method of manual planting by means of monitoring and remote controlling through the Internet of Things (see paragraph 0015 "the user can perform intellectual management and control of the plants by controlling any one of the terminal computer, the tablet terminal or the mobile terminal"), reducing labor intensity and conducting information management of food sources. However, the remote control set forth in this technology is based on labor and can not satisfy the intelligent management of large-scale distributed planting.

Chinese Patent Application Publication CN102884932A (Application No. CN2012104227706) sets forth an earth-culture plant growth and cultivation system based on a planting expert cloud. Specifically, the document "provides an intelligent earth-culture plant growth and cultivation system based on a planting expert cloud, including a planting expert cloud center, a communication network and one or more intelligent planting apparatuses" to realize "storing and sharing planting experience information" and "realizing the planting in a resource sharing manner". Planting experience information sets forth soil pH value, ambient light intensity, temperature and humidity. However, the planting guidance data in this technology uses the pre-set values. Due to many different factors in urban geography and family environment, the technology does not take into account these different factors, such that the collected empirical data which has been uploaded is in a mess and can not actually guide the cultivation.

The living environments in modern cities are various, leading to planting environment of the people varying from indoors to outdoors. Different cities have different climatic conditions, some cities are wet and some are dry. Even in the same city, the planting environments are different in different regions or residential quarters. Even the planting environments such as light conditions on different floors and in different orientations in the same district are not the same.

These prior-art planting guidelines are based on pre-set values. Obviously, they can not be "taught according to their aptitude" and can not be adjusted according to the specific planting environment. The guiding effect can be imagined.

SUMMARY

Based on the above problems existing in the prior arts, the object of the present invention is to realize intelligent management of large-scale distributed planting in different planting environments. Further, the present invention can solve the problems that individual families want to grow their own plants but lack the planting management experience and can not obtain good benefits. In addition, the present invention can also solve the problem that individual families have no time to manage.

In order to achieve the above object, the present invention sets forth using the Internet, big data analysis, machine learning and intelligent family hardware and software technology to build an intelligent planting system and establish an intelligent planting starweb.

To achieve the above object, according to one aspect of the present invention, the present invention provides an intelligent planting management method for controlling planting processes of plants in a plurality of planting devices placed in different environments, including a data collection step, classification-marking step and a regulation step, wherein the data collection step includes: collecting planting information of a plant and information of environments where the planting devices are placed, and sending the same to a data processing system; collecting at least one planting condition information of a plurality of planting conditions at predetermined time intervals, and sending the planting condition information to the data processing system; and collecting plant features of the plants, and sending the plant features to the data processing system;

the classification-marking step comprises: in the data processing system, classifying based on a planting information and an information of environment, scoring based on the plant features of the planting devices and comparing the scores of the plant features of the plurality of planting devices, according to the preset conditions under the same category, marking the planting condition information of the planting device with a high plant feature score, and storing the marked planting condition information under each category related to the plant growth cycle;

the regulation step comprises: comparing the current planting condition information with the stored marked planting condition information based on the planting information and the information of environment of respective planting device, and when the difference between the former and the latter exceeds a threshold, generating regulation data based on the stored marked planting condition information and the current planting condition information; and sending the regulation data to respective planting device to perform the regulation operation on the planting condition of respective planting device.

According to another aspect of the present invention, the present invention provides an intelligent planting apparatus that controls planting processes of plants in a plurality of planting devices placed in different environments, including a data collection device, a classification-marking device, and a regulation device, wherein the data collection apparatus collects the planting information of the plants and the information of the environments where the planting devices are placed, collects at least one planting condition information of the plurality of planting conditions at predetermined time intervals, and sends the collected information to the classification-marking device;

the classification-marking device classifies the received information based on the planting information and the information of environment, scores based on the plant features of the planting devices, according to a preset condition under the same category, compares the plant feature scores of a plurality of planting devices, marks respective planting condition information of the planting devices having a high plant feature score within the plant growth cycle, and stores the marked planting condition information under each category related to the plant growth cycle;

the regulation device compares the current planting condition information with the stored marked planting condition information based on the planting information and the information of environment of respective planting device, and when the difference between the former and the latter exceeds the threshold, regulation data are generated based on the stored marked planting condition information and the current planting condition information, and the regulation data is sent to respective planting device for performing the regulation operation on the planting condition information of respective planting device.

According to another aspect of the present invention, an intelligent planting apparatus is provided, which comprises a client end, a starweb formed by a plurality of starweb units, and a closed-loop optimization platform, wherein the client end is connected to the closed-loop optimization platform through the Internet for acquiring information such as pre-warnings, current planting conditions, and the like, and can manually control each starweb unit through a closed-loop optimization platform, the starweb unit and the closed-loop optimization platform are connected through the Internet, and each starweb unit includes a measurement device, a control device and an Internet access module, wherein the measurement means measures information of environment and planting condition information of the planting device of the plants, then sends the measured data to the access module, the access module submits the information data to the closed-loop optimization platform via the Internet and receives the regulation data from the closed-loop optimization platform, and the control device controls the planting conditions of the planting device according to the regulation data.

the closed-loop optimization platform receives information data from each starweb unit, classifies the received information based on the planting information and the information of environment, scores based on the plant features of the planting devices, according to a preset condition under the same category, compares the plant feature scores of a plurality of planting devices, marks respective planting condition information of the planting devices having a high plant feature score within the plant growth cycle, and stores the marked planting condition information under each category related to the plant growth cycle, wherein the closed-loop optimization platform compares the current planting condition information with the stored marked planting condition information according to the planting information and the information of environment of respective planting device, and when the difference between the former and the latter exceeds the threshold, generates the regulation data according to the marked planting condition information and the current planting condition information, and sends the adjustment data to each of the starweb units so as to perform the regulation operation on the planting conditions of the planting devices of each starweb unit.

The invention is characterized by being capable of being applied to large-scale distributed planting and establishing an automatically-executed intelligent optimized closed-loop based on big data analysis. Therefore, the present invention can learn to adjust according to the specific planting environment and has the ability of self-optimization.

Under the premise of fully considering the urban environment, the invention solves the problem of management complexity of large-scale decentralized family planting, greatly reduces personnel management and study cost, and helps people lacking cultivation experience to obtain good planting benefits so that urban large-scale distributed ecological agriculture can be achieved.

BRIEF DESCRIPTION OF THE FIGURES

The present invention can be appreciated by the description which follows in conjunction with the following figures, wherein:

FIGS. 1A to 1C are schematic diagrams illustrating planting data collection according to one embodiment of the present invention, wherein FIG. 1A shows data confirmed through an input of the user, FIG. 1B shows data obtained through networking, FIG. 1C shows data obtained through monitoring of sensors;

FIGS. 3A to 3E show an evaluation model according to an embodiment of the present invention, wherein FIG. 3A shows the principle of creating a model, FIG. 3B shows a planting evaluation index, FIG. 3C shows a method of judging the model rationality, 3D shows abnormal data cleaning step, FIG. 3E shows an evaluation formula;

DETAILED DESCRIPTION OF THE EMBODIMENTS

The embodiments of the present invention will be described in detail with reference to the accompanying drawings.

As generally explained before, the intelligent planting management system comprises a data collection device, a classification-marking device, and a regulation device for respectively performing a data collection operation, a classification-marking operation, and a regulation operation.

[Data Collection Operation]

Figure 1A:
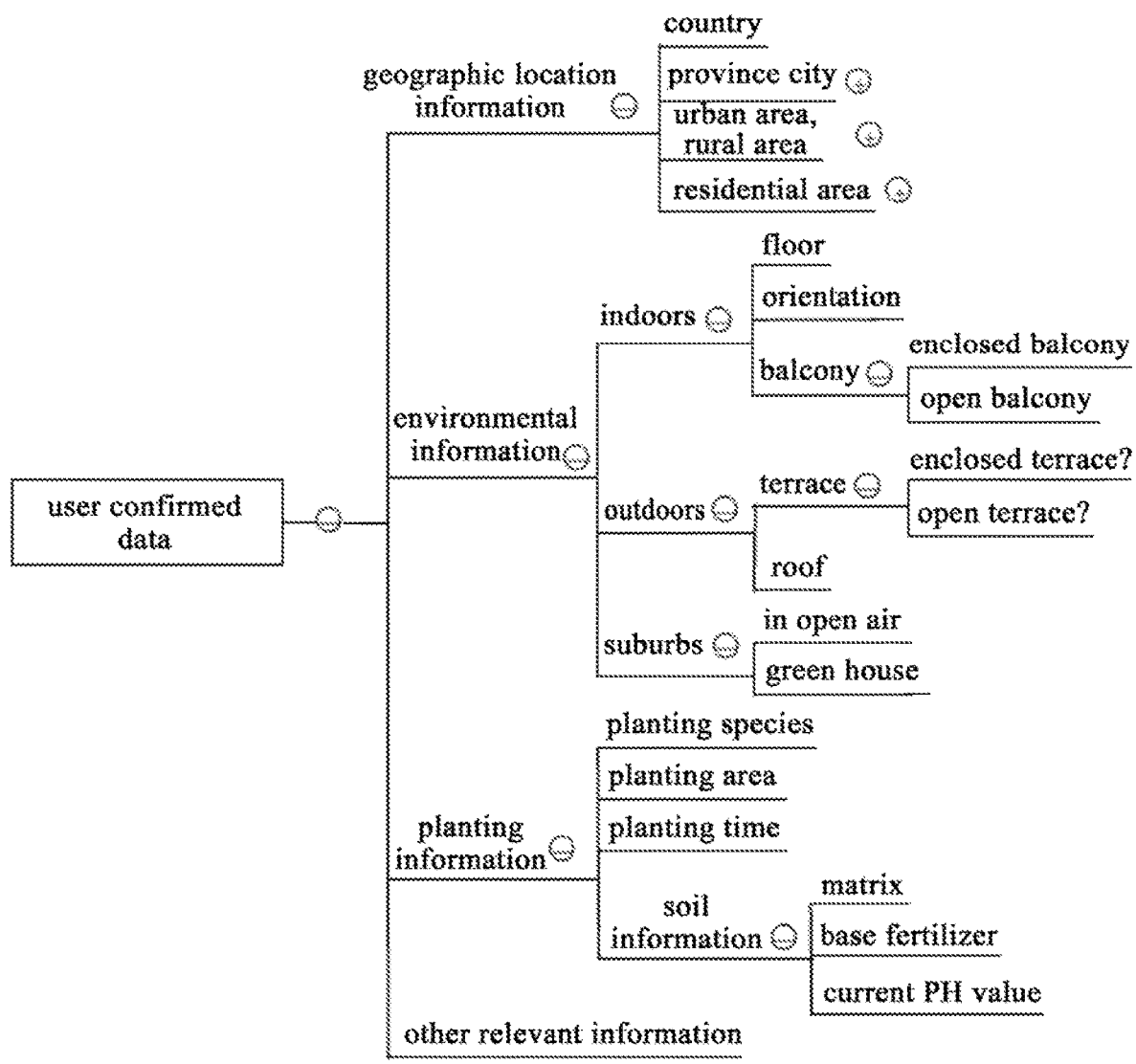
Figure 1B:
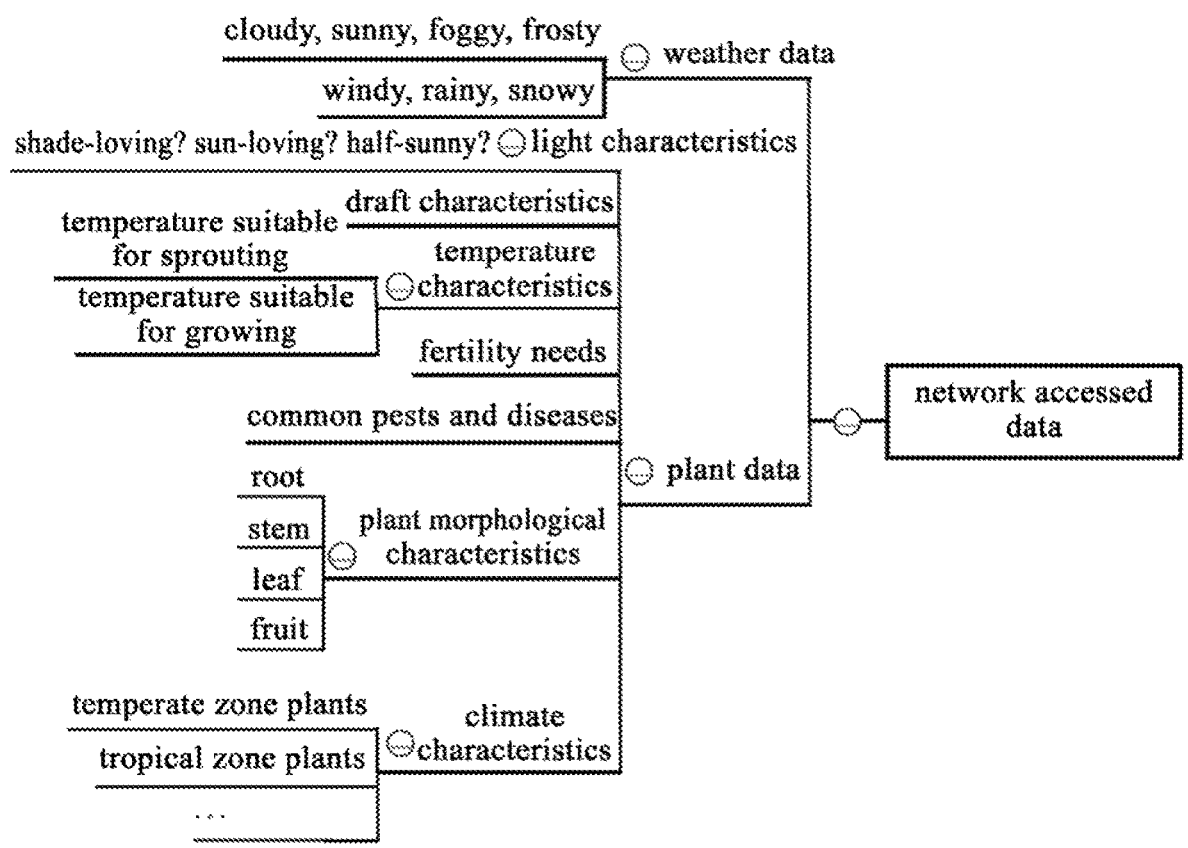
Figure 1C:
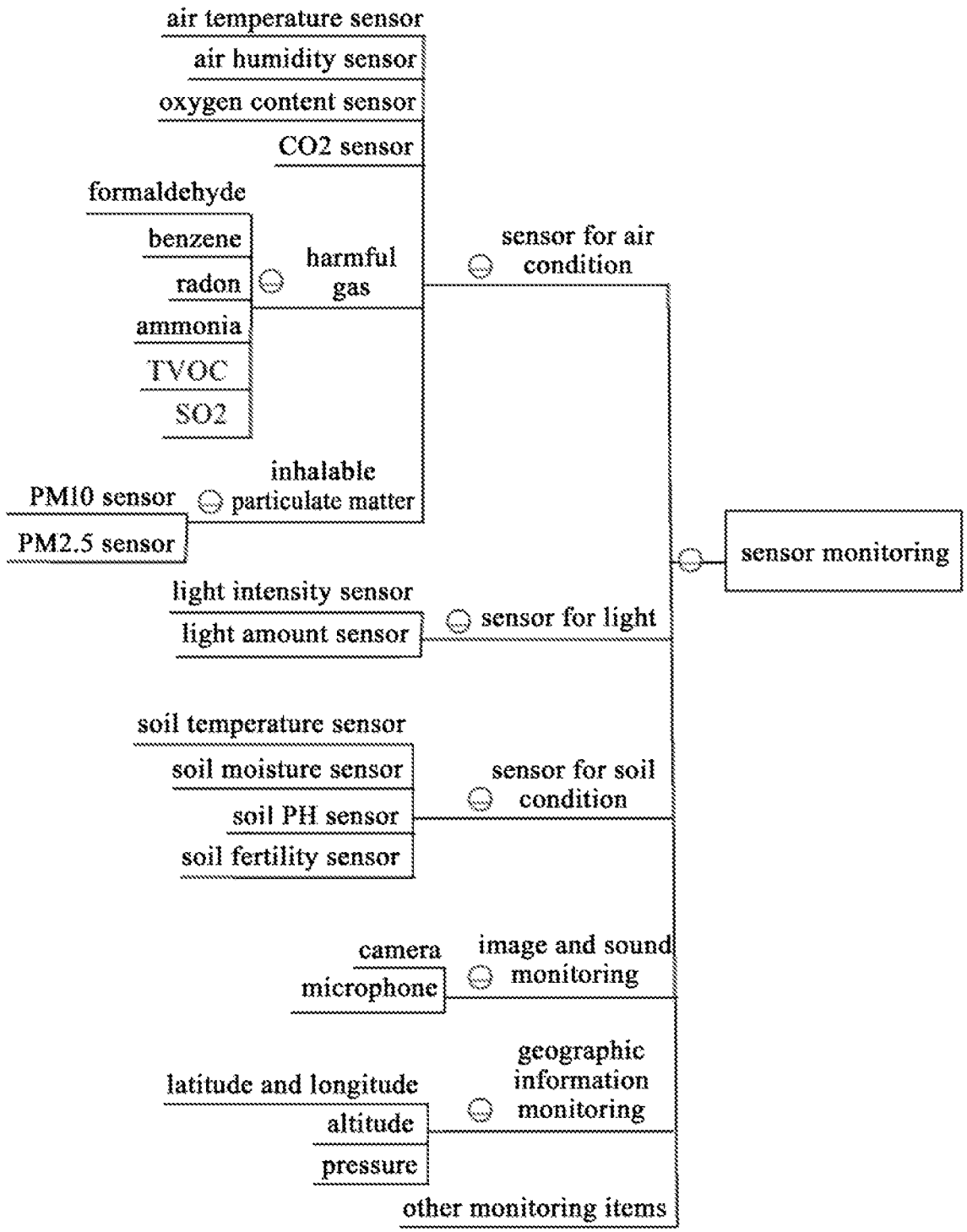

FIGS. 1A to 1C are schematic diagrams illustrating planting data collection according to one embodiment of the present invention. In the present embodiment, the data collection method comprises a user input conformation mode (FIG. 1A), a networking acquisition mode (FIG. 1B), and a sensor monitoring mode (FIG. 1C).

In terms of properties of the planting data, the data required to be collected may be classified into four types: planting information of plants, information of environments where the planting devices are placed, planting condition information, and plant features of the collected plants.

(1) Collection of Planting Information of Plants

Planting information of plants includes plant species, planting area, planting time, and soil information. Wherein, the soil information includes types of soil matrix, types of base fertilizer, mixing ratio of soil matrix to base fertilizer, soil pH value, and soil conductivity. Those pieces of planting information of plants may be acquired by user input and detection of a measuring device.

Plant species may further include relevant data of a specified plant, such as, characteristics on distribution area of the plant (for example, the plant is generally distributed in a temperate area or a tropical area), morphology of the plant (including morphologies such as root, stem, leaf, fruit or the like), characteristics on lighting, moisture, temperature and fertility as required by the plant, and common pests and diseases of the plant, etc. And those pieces of information can be acquired through networking by using the search technique based on the plant species input by the user.

Furthermore, the plant planting information may be acquired at the beginning of the planting, with no need to monitor all the time.

(2) Collection of Information of Environments where Planting Devices are Placed

The environment information data include address information and location information. Wherein, the address information is, for example, the estate information of the house where the planting device is located. In a case where the planting device is placed indoors, the location information includes the floor at which the house is present, whether the planting device is placed in the house or in a closed balcony, orientation of the house or the closed balcony, and lighting condition of the window; or in a case where the planting device is placed outdoors, the information includes whether the planting device is placed in a yard, a terrace, a roof, or an open balcony. And the information of environments can be acquired by user input. The plant information of environments can be acquired at the beginning of the planting, with no need to monitor all the time.

In addition, the plant environment information may further include weather information, e.g., temperature information (such as, temperature at each hour, the highest and lowest temperatures of each day or the like), wind force information, lighting information, and wind/rain/snow/fog information or the like of the geographical location for each day. Those pieces of environment information may be acquired regularly through networking based on the address information input by the user.

(3) Collection of Plant Conditions

Plant conditions include rainfall amount, air conditions, soil conditions and lighting conditions.

The air conditions may include air temperature, air humidity, ventilation condition, oxygen content, carbon dioxide content, harmful gas content, and inhalable particles or the like. Wherein, the harmful gas refers to formaldehyde, benzene, radon, ammonia, volatile organic compounds and sulfur dioxide or the like. The inhalable particles refer to PM10, PM2.5, or the combination thereof.

The soil conditions are selected one or more from the following groups: soil pH value, soil conductivity, soil temperature, and soil humidity.

The lighting conditions are selected one or more from the following groups: lighting intensity and lighting duration.

The planting condition information can be acquired via various measuring devices; a measuring operation can be performed at a predetermined timing or at a predetermined time interval, or the measuring can be activated at a time set according to other manners.

(4) Collection of Plant Features

Plant features include planting process information and harvested plant feature.

The planting processing information at least includes: germination rate based on germination number and planting area; germination duration based on the germination ending time and sowing time; health situation of a leaf; disease and pest situation; and seedling height and leaf area of the plant. The plant process information can be acquired by user input and/or the measuring device, for example, pictures are captured and then analyzed and processed to acquire the information. Acquisition operation of the planting process information can be performed at a predetermined time or at a predetermined time interval, or the operation can be activated at a time set according to other manners.

Harvested plant features at least include: harvesting situation per unit planting area; yield situation per unit planting area; florescence time of the plant; and the planter's subjective evaluation which includes self-evaluation of the growing process, self-evaluation of the harvesting situation, taste evaluation of fruits/leafy vegetables/rhizomes, and evaluation of ornamentation of the plant. Those harvested plant features are acquired by user input and/or the measuring devices, for example, pictures are captured and then analyzed and processed to acquire the features.

In addition, means of collecting the two kinds of plant features further include capturing images or videos etc.

[Classification and Evaluation-Marking Operation]

1. Classification-Storing Operation of Data

Due to complexity of the biological science, the comparison between various data (such as, data about temperature, humidity, lighting or the like) collected during the plant planting process only makes sense under the same/similar dimensionality (that is, the same/similar environment), and only in this way, it can be further used to instruct the planting practically.

Figure 2:
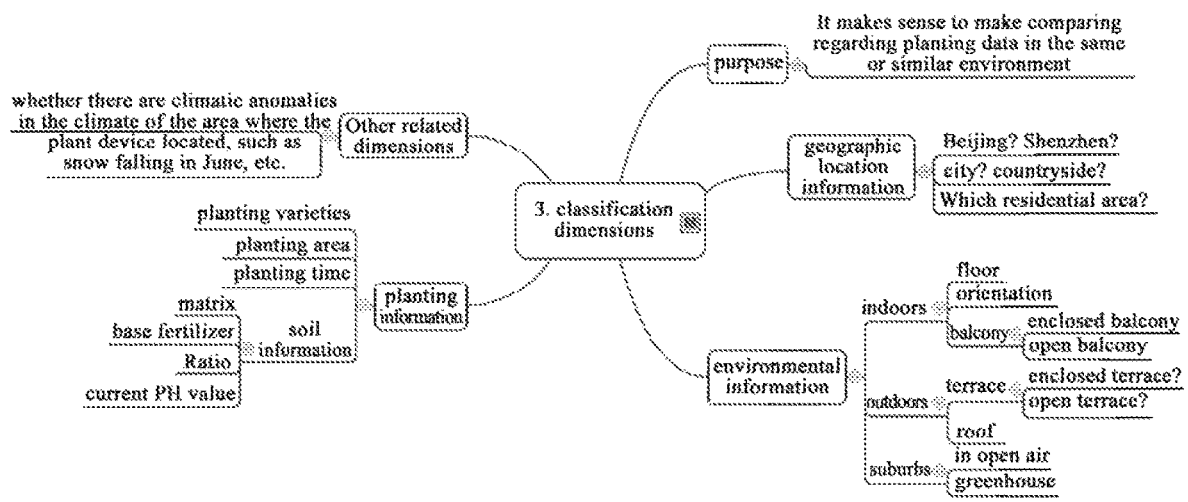
FIG. 2 shows classification and storing of planting data according to dimensions.

Thus, the collected planting data must be stored in classification according to a specific dimensionality. The dimensionality includes but not limited to address information dimensionality, planting environment information, and planting information or the like, referring to FIG. 2.

Examples are provided below for explanation. Planting is performed in a house located in Tiantongyuan Estate, Beijing with the planting device being placed indoors on a closed balcony. Cilantro is planted at the beginning of April with the same soil proportion, and data in its growth cycle serve as a data set under one dimensionality. In the same period, 40 households plant cilantro in their houses, so the evaluation of planting conditions is limited to the 40-household planting data set (as a category). And if only one household plants coriander in the same period under this dimensionality and thereby few planting data exist in the same area, the data under similar conditions (adjacent area or similar dimensionality) will be found and then merged as the same category so as to be evaluated and selected preferably while preferably selecting the planting condition data is performed later. For example, the Huilongguan Estate is treated as a similar estate of the Tiantongyuan Estate due to the adjacent geographical location, the data set of the cilantro planted indoors on the closed balcony at the beginning of April using the same soil proportion is classified as the data set under the similar condition. That is to say, when there is few data in the Tiantongyuan, the data at the adjacent area can be selected and merged as the same category. And later, when the recent data evaluation and preferably selection is performed, it is based on the data of the same category.

2. Evaluation-Analysis Operation of Data

Figure 3A:
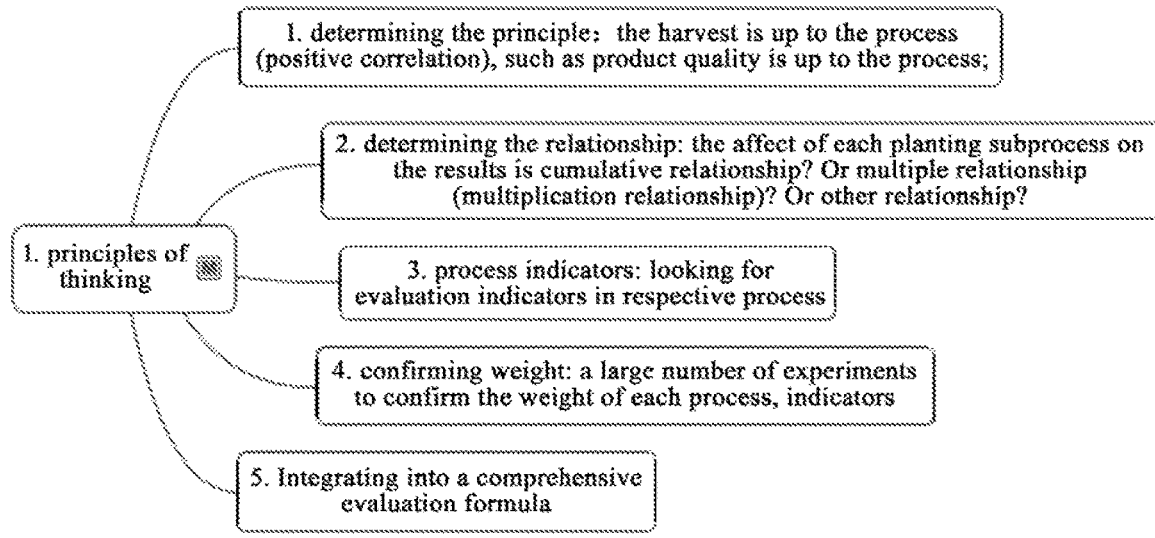
Figure 3B:
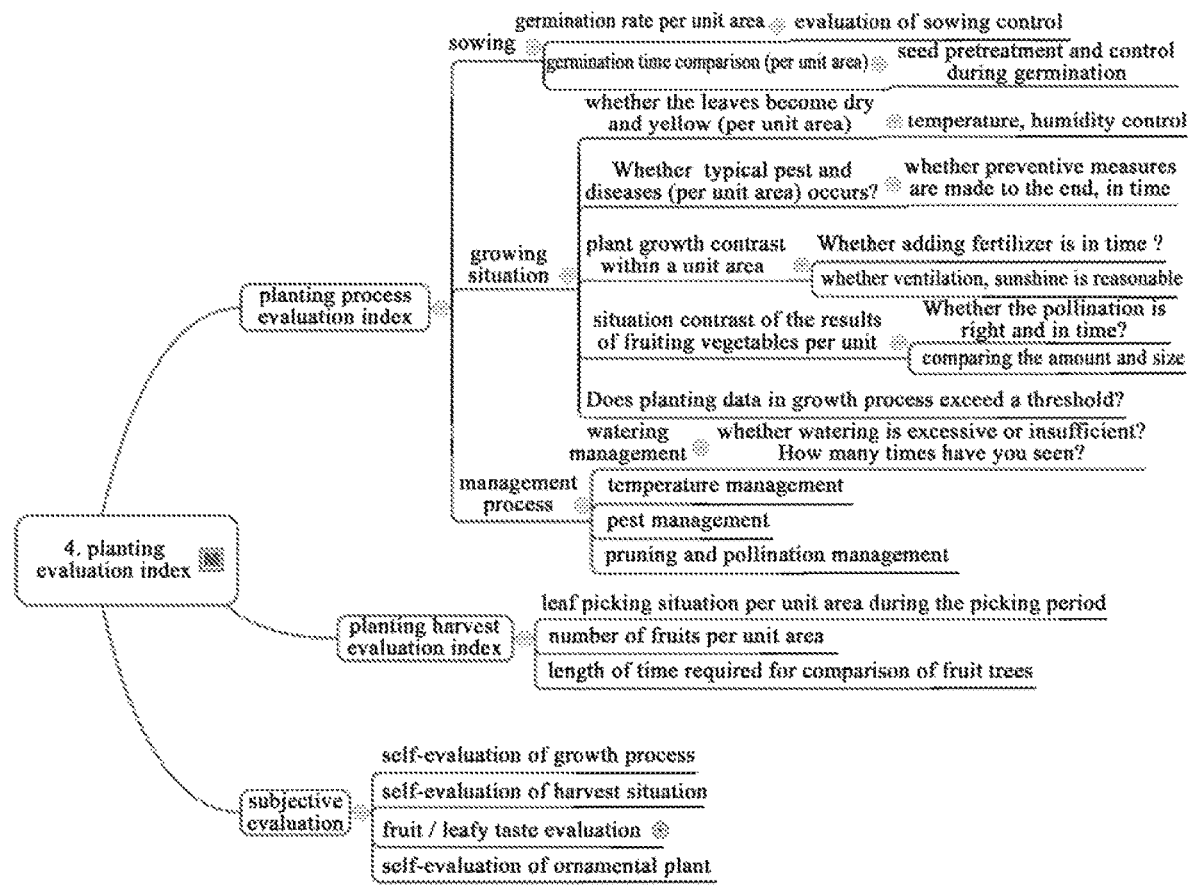
Figure 3C:
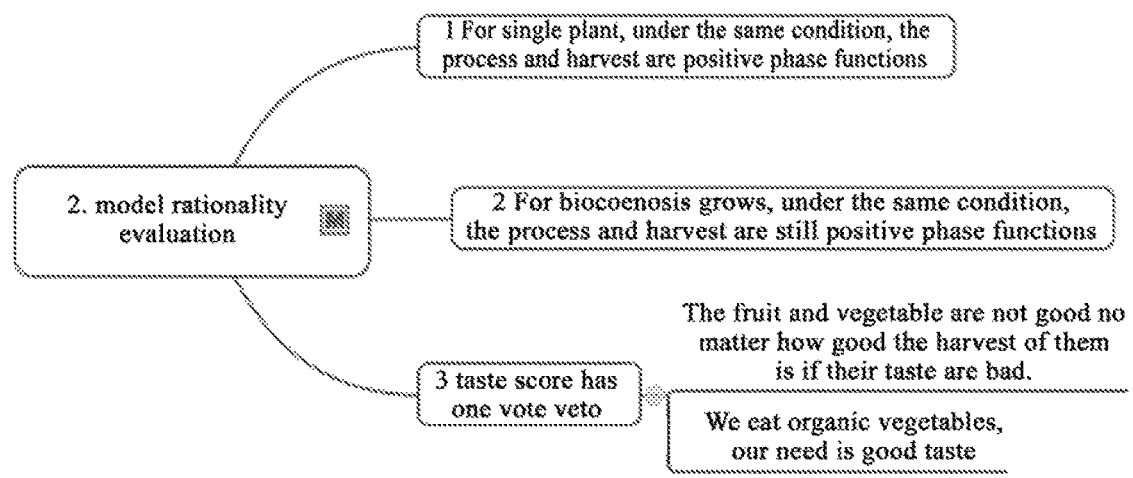
Figure 3D:
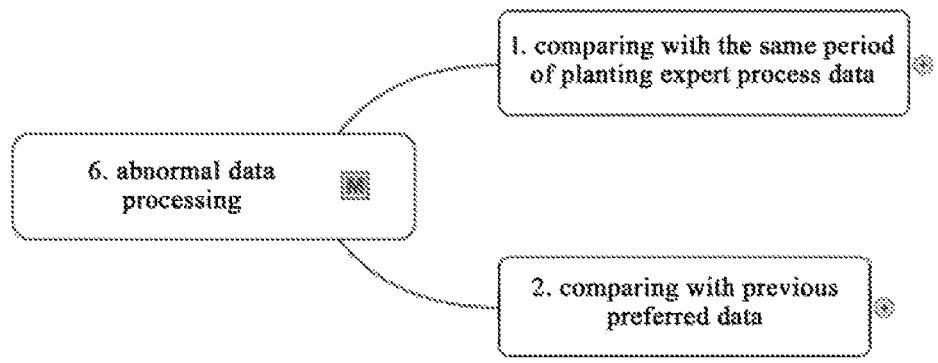
Figure 3E:
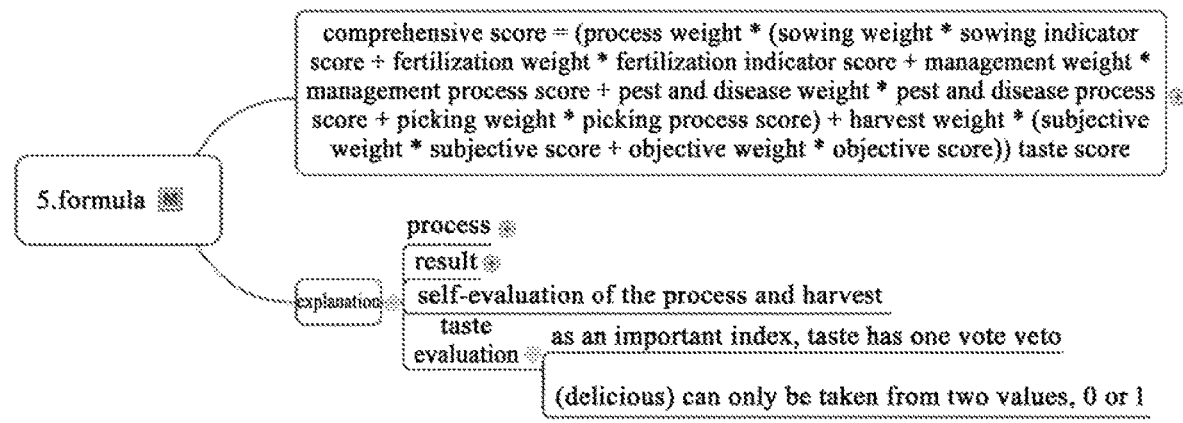

FIG. 3A to FIG. 3E illustrates an evaluation model according to one embodiment of the present invention, wherein FIG. 3A illustrates a concept principle of creating the model; FIG. 3B illustrates planting evaluation indicators; FIG. 3C illustrates a determination method of the model rationality; FIG. 3D illustrates abnormal data cleaning; and FIG. 3E illustrates an evaluation formula.

As known by those skilled in the art, suitable planting conditions (e.g., temperature, humidity, soil conditions) can result in harvesting plants with better plant features (e.g., plant height, fruit yield, taste of fruits/leaves/rhizomes, etc.). Thus, if the harvested plants have excellent plant features, it can be shown that the planting conditions during the planting are suitable.

Similar to the relationship that the product quality is decided by the manufacturing process, the harvest of plants is determined by the planting process, and the two are in a positive relationship. This is a basic principle of the overall evaluation model.

Thus, as illustrated in FIG. 3A, the prevent invention proposes that a plant with high scores is selected after evaluating or scoring-analyzing the plant features (including the planting process information and the harvested plant feature), and the planting condition data collected and acquired during the planting of the plant are marked (as the preferred data) and stored; then, at the next round of planting, the marked plant condition data of the plant are used to guide a new round of planting.

When determining the relationship between the planting conditions and the plant features, the following relationships can be considered: whether the effects of respective planting sub-processes on the results are an accumulating relationship, or a multiple relationship (that is, a multiplicative relationship), or other relationships; and the influence mode of respective sub-processes on the harvested plant features.

Thus, how to evaluate the plant planting process and the harvesting situation and how to build the relationship therebetween are two keys for data evaluation. As to this point, the present invention proposes a new data acquisition or selection method, that is, to perform data evaluation on the plant planting process and the harvesting situation after analyzing and processing a large amount of planting data.

In the selection process for determining which plant feature data are better under the same or similar conditions, the manual participation shall be as little as possible since there is a large amount of data involved in the big data analysis, and more data analysis shall be performed automatically using the information technology.

As stated above, plant features are classified into two categories: the planting process information and the harvested plant feature. In the present embodiment, the two plant features are scored comprehensively.

The growth and physiological indicators that are customarily measured include indicators, such as, photosynthetic rate, chlorophyll content, leaf water potential, stomatal conductance, leaf area or the like.

The plant growth amount can be expressed by the raw weight, dry weight, length, area and diameter or the like of plant organs. The plant growth accumulation amount is the amount accumulated during the growth, that is, the actual amount of plant material in the measurement, which is equivalent to the plant's appearance. Growth rate refers to the speed of growth, which is equivalent to the vigor of the plants, and the rate can be expressed as two types, an absolute growth rate and a relative growth rate. The relative growth amount refers to a percentage of the net increased biomass of the plant over the biomass before processing in a certain period of time.

Traditional measurement of the growth amount is often the comparative evaluation preformed after the harvest in the laboratory based on measurement of the fresh weight, dry weight, length or the like. The photosynthetic rate and chlorophyll content can only be measured under a laboratory environment. The evaluation of those indicators all targets at the condition of the plant per se. However, we also need to evaluate the planting process in which people participate, consider the mutual influence of species group formed by multiple plants, build a positive relationship between the plant growing process and the harvest situation, and then draw the association between the process and the harvest, so as to accumulate a large amount and lay a good foundation to realize standardize, processize and industrialize the planting process.

FIG. 3B illustrates contents of the planting evaluation, including planting process evaluation, planting harvest evaluation, and subjective evaluation.

2.1 Planting Process Evaluation

The planting process relates to a sowing process, a plant growing process, and a planting management process. The processes are respectively evaluated in this embodiment.

2.1.1 Evaluation of Sowing Process

The sowing process mainly relates to the germination situation, and the evaluation can be performed by selecting the planting density (germination success rate) or germination duration as parameter indicators. The two indicators are used to evaluate the maturity of a sowing nursery process.

The planting density (germination success rate)=germination number/planting area.

Photos captured in the third day after the accepted germination duration are extracted, and then the germination number can be acquired through calculation after processing the photos. The planting area is the data confirmed by the user and is acquired by the user input.

Proper planting density can be compared with the historical data or common accepted data. An excessively high planting density may influence normal growth of the plant, and an excessively low planting density may influence the final harvest.

Germination duration=germination ending time−sowing time

The germination ending time is acquired as follows: extracting photos captured in the third day after the common accepted germination duration since the sowing, and selecting the time when no large quantities of new sprouts grown as the germination ending time.

2.1.2 Evaluation of Growing Process

As to growth situation of plant leaves, the occurrence or absence of painfully yellow and withered leaves and seedling deaths, the number of occurrence, and the number of related seedlings etc., all these situations can be determined by detecting the picture data in the planting process.

And as to whether the insect damage occurs during the planting process and the number of occurrence, the situations can be determined by detecting the picture data in the planting process.

As to vigor of the plant, the plant height and leaf size of the plant at the same growth time can be considered; and this situation can be determined by detecting the picture data in the planting process.

As to the fruit tree, the duration taken to bear the fruit can be considered.

In addition, it can be considered whether there occurs a situation where the planting data exceeds a threshold in the growing process.

2.1.3 Evaluation of Planting Management Process

The planting management process includes watering management, temperature control management, pest and disease management, and seedling thinning-pruning, pollination management or the like. The evaluation contents of each management process will be described below in detail.

(1) Evaluation of Watering Management

As known to all, the water quantity required by the plants varies with the plant species, and too much or too little water may be not conducive to growth of the plants.

Thus, different plant specifies adopt different watering policies. For example, as to some flowers adaptive to wetness, such as rhododendron, camellia, michelia, gardenia, aglaia or the like, they can be watered in the principle of "see dry see wet", that is, to perform watering when the surface of the cultivation medium becomes white until it comes to be wet; as to potted flowers adaptive dry and afraid of waterlog, such as, orchids, *Chimonanthus praecox*, geranium or the like, they can be watered in the principle of "dry thoroughly watering thoroughly", that is, to perform watering when the cultivation medium becomes dry; and as to five-leaved pine, black pine and xerophytes, they can be watered in the principle of "prefer dry rather than wet", that is, to perform watering when the cultivation medium is dried up, and the waterlogging shall be avoided.

As to the water quantity, it shall be noticed whether the root of the plants has ever been blacken and cankered (over-watering), whether the plants has ever been withered (lack of watering), and whether the soil humidity and air humidity of the plant exceed the threshold.

In addition, the watering time shall be selected reasonably. In general, watering shall be performed during the plant growing process and shall avoid the sun exposure. Thus, the watering shall be performed after 9:00 am to 10:00 am in winter and shall be performed before 8:00 am and after 5:00 pm in summer.

Furthermore, the placement of planting devices shall also be considered during watering, and as to plants directly under sunlight, the water quantity shall be large in the morning, otherwise, the water may be evaporated before the afternoon.

(2) Evaluation of Temperature Control Management

The plant requires different temperature in different stages, for example, sowing temperature of the watermelon shall be 20-25 degrees, and the growing temperature shall be 15-35 degrees. Thus, the temperature control shall take different requirements in different stages of the plant into consideration.

In summer, if the temperature is too high, cooling shall be performed timely, such as, cooling by spraying or sun shading.

In winter, if the temperature is too low, the heat preservation shall be performed timely.

(3) Disease and Pest Management

The management comprises: whether there has been diseases or pests, and the number of the occurrences; whether the leaf surface and fruit has been affected by diseases or pests; whether there has been disease or pest prevention operation, such as, spraying pest control preventing agent (e.g., ginger water that can prevent germination of the sooty mold, soft rot, and bacteria spores) or the like; and whether the disease and pests are handled timely, such as, spraying pesticides (such as, pepper water that kills the aphid) or the like.

(4) Seedling Thinning-Pruning and Pollination Management

Thinning process shall be performed when the planting density is large after sowing, and it shall be noticed whether the thinning process reaches or approaches the recommended planting space between the plants. Furthermore, the pruning and pollination management is required during the plant growing process, and it shall be noticed whether there is branches requiring pruning, and if yes, the branches shall be pruned appropriately, and whether the pollination is performed as required.

2.2. Evaluation of Planting Harvest

As to leafy vegetables, their planting harvest features refer to the harvest situation per unit area during the picking period. The picking amount can be determined by comparing the pictures, and/or by inputting into the system by the user after picking and weighing.

As to fruits, their planting harvest features refer to the amount of fruits to be born per unit area. The picking amount can be determined by comparing the pictures, and/or by inputting into the system by the user after picking and weighing.

As to ornamental plants, their planting harvest features refer to situations in the florescence phase. The florescence time and duration can be determined by comparing pictures in different times.

2.3 Subjective Evaluation

The subjective evaluation means the planter's self-evaluation, which includes self-evaluation of the growing process, self-evaluation of the harvesting situation, taste evaluation of fruits/leafy vegetables/rhizomes, and/or evaluation of ornamental plants.

2.4 Model Rationality Determination

A evaluation standard shall be determined to ensure and detect whether the constructed model is reasonably used or not. In the present embodiment, as illustrated in FIG. 3C, the principle of determining the model rationality is as follows:

As to the plant growing alone, the process and harvest has a positive function therebetween under the same conditions.

As to the plants growing in group, the process and harvest still has a positive function therebetween under the same conditions.

The taste scoring has the one-vote negation right. Because what to be pursuit by us is not only the yield but also the health and safety. As to vegetables and fruits, taste is much more important than the yield.

2.5 Evaluation Steps

Step 1. selecting a data set having the same/similar dimensionality; Step 2. evaluating the sowing nursery process during the planting; Step 3. evaluating the growing process using the growing process indicator; Step 4. evaluating the management process using the management process indicator; Step 5. evaluating the harvest situation using the planting harvest indicator; Step 6. comparing with evaluations of the related process in the previous better planting data one item by one item, and recording the comparison result; Step 7. after completion of the indicator evaluation, using different weighted values to synthesize respective processes and their indicators, so as to obtain the overall score of the planting process; Step 8. selecting the better planting data, and fitting curves with respective monitoring items of the previous better planting data; Step 9. performing differencing and derivation of values at the same time point, to determine whether the variation trend is identical or not and whether the difference value exceeds the preset value; Step 10. marking those that are not identical or exceeds the preset value to be mutation data; Step 11. fitting curves with respective monitoring data in the experts' planting process at the same period (the same period in the plant growing process); Step 12. performing differencing and derivation of values at the same time point, to determine whether the variation trend is identical or not and whether the difference value exceeds the preset value; Step 13. marking those that are not identical or exceeds the preset value to be mutation data; Step 14. notifying the planting experts of the system to perform manual intervention process if the same one data is marked twice as the mutation data; Step 15. selecting data scoring high in both comprehensive evaluation and respective processes by referring to the subjective self-evaluation of the user; and Step 16. adding into the preferred planting model the selected better planting data adding version.

Above steps 8-14 are mutation data cleaning steps, and the mutation data cleaning will be described below in detail.

As illustrated in FIG. 3D, in the present embodiment, two manners are used to clean the mutation data: comparing with the planting expert process data at the same period, and comparing with the previous preferred data.

Curve fitting is performed with respective monitoring data in the experts' planting process at the same period. Differencing and derivation of values at the same time point are performed to determine whether the variation trend is identical or not and whether the difference value exceeds the preset value. Those that are not identical or exceed the preset value are marked to be mutation data.

Better planting data are selected as compared with the previous preferred data, and then curve-fit with respective monitoring items of the previous preferred planting data. Differencing and derivation of values at the same time are performed to determine whether the variation trend is identical or not and whether the difference value exceeds the preset value. Those that are not identical or exceed the preset value are marked to be mutation data.

The process data that are marked as mutation data twice will be removed from the preferred-data set, and the planting experts of the system will be notified to perform manual analysis, research and intervention.

2.6 Formula

The evaluation formula is based on the plant process feature and the plant harvest feature. In the embodiment of the present invention, as illustrated in FIG. 3E, a following evaluation formula is selected:

comprehensive score=(process weight*(sowing weight*sowing indicator score+fertilization weight*fertilization indicator score+management weight*management process score+pest and disease weight*pest and disease process score+picking weight*picking process score)+harvest weight*(subjective weight*subjective score+objective weight*objective score)) taste score Wherein, the weight of respective processes and indicators are determined based on a large quantity of experiments. And the weighted value determines the influence of respective processes and indicators on the harvest and results.

[Regulation Operation]

The regulation operation instructs the planting using the planting condition data corresponding to the better plant features. The regulation can be performed with respect to one or more planting conditions.

Specific planting conditions have been specifically described in the previous data collection unit, and the regulating methods of several planting conditions will be described below.

1. Temperature Regulation

Step 1. monitoring the temperature (soil temperature and air temperature) of the current planting environment every hour, and uploading the temperature to a closed-loop optimization platform through an access module;

Step 2. determining whether the temperature deviates from the threshold by comparison in the closed-loop optimization platform using the preferred data;

Step 3. ending if the temperature is not deviating from the threshold;

Step 4. generating relevant regulation information if the temperature deviates from the threshold, e.g., to regulate the temperature to a certain value;

Step 5. the control system querying whether there is regulation information using the access module;

Step 6. the control system downloading the regulation information and notifying the monitoring module to adjust the temperature monitoring frequency, e.g., to monitor every 5 minutes;

Step 7. regulating the temperature according to the regulation information; and spraying water to cool down or shading the sun if the temperature is over-high, and heating if the temperature is over-low;

Step 8. the monitoring module transmitting the temperature changes periodically to the control system;

Step 9. the control system comparing the temperature to the regulation target to determine whether the temperature reaches the temperature regulation target; and Step 10. ending the regulation if the temperature reaches the temperature regulation target; uploading the regulation result to the closed-loop optimization platform; and continuing the regulation if the temperature does not reach the target.

2. Humidity Regulation

Step 1. monitoring the humidity (soil humidity and air humidity) of the current planting environment every four hours, and uploading the humidity to a closed-loop optimization platform through an access module;

Step 2. the closed-loop optimization platform determining whether the humidity deviates from the threshold by comparison using the preferred data;

Step 3. ending if the humidity is not deviating from the threshold;

Step 4. generating relevant regulation information if the humidity is deviating from the threshold, e.g., the humidity reaches a certain value;

Step 5. the control system querying whether there is regulation information using the access module;

Step 6. the control system downloading the regulation information and notifying the monitoring module to adjust the humidity monitoring frequency, e.g., to monitor every 30 seconds;

Step 7. regulating watering according to the regulation information;

Step 8. the monitoring module periodically transmitting the humidity changes to the control system;

Step 9. the control system comparing the humidity to the regulation target to determine whether it reaches the humidity regulation target; and Step 10. ending the regulation if it reaches the target; uploading the regulation result to the closed-loop optimization platform; and continuing the regulation if it does not reach the target.

3. Lighting Intensity Regulation

Step 1. monitoring the lighting intensity of the current planting environment every hour, and uploading the lighting intensity to a closed-loop optimization platform through an access module;

Step 2. the closed-loop optimization platform determining whether the lighting intensity deviates from the threshold by comparison using the preferred data;

Step 3. ending if the lighting intensity is not deviating from the threshold;

Step 4. generating relevant regulation information if the lighting intensity deviates from the threshold, e.g., by shading the sun for two hours or compensating LED light until the lighting amount reaches a certain quantity of lighting;

Step 5. the control system querying whether there is regulation information using the access module;

Step 6. the control system downloading the regulation information and notifying the monitoring module to adjust the lighting monitoring frequency, e.g., to monitor every 30 minutes;

Step 7. compensating LED light/shading the sun according to the regulation information;

Step 8. the monitoring module periodically transmitting the light intensity changes and the lighting duration to the control system;

Step 9. the control system comparing the lighting data to regulation target so as to determine whether it reaches the lighting regulation target; and Step 10. ending the regulation if it reaches the target; uploading the regulation result to the closed-loop optimization platform; and continuing the regulation if it does not reach the target.

4. Soil Fertility Regulation

In the present embodiment, the soil fertility level is indicated by detecting the soil conductivity.

Step 1. monitoring the soil conductivity of the current planting environment, and uploading it to a closed-loop optimization platform through an access module;

Step 2. the platform determining whether the regulation is required according to the current growing stage, last detection time, and the current soil conductivity;

Step 3. generating the regulation information if the regulation is required, e.g., information on the amount of liquid fertilizer to be added to the water, so as to adjust the soil conductivity;

Step 4. the control system querying whether there is regulation information using the access module;

Step 5. the control system downloading the regulation information and notifying the monitoring module to adjust the soil conductivity monitoring frequency;

Step 7. mixing the liquid fertilizer and the water according to the regulation information;

Step 8. watering the fertilizer and water together next time; and

Step 9. the monitoring module periodically transmitting levels of the soil conductivity to the control system.

5. Pest Removing Regulation

Step 1. providing corresponding pest biological agents according to planting species of the user, and the user adding the agent into the control apparatus;

Step 2. obtaining pictures of the pest situation pictures under the current planting environment through monitoring, and uploading to a closed-loop optimization platform through an access module;

Step 3. the platform identifying and determining the occurrence of pest by picture processing, and thereby generating the regulation information;

Step 4. the control system querying whether there is regulation information using the access module;

Step 5. the control system downloading the regulation information;

Step 6. mixing the pest removing agent and the water according to the regulation information;

Step 7. spraying the agent together with water in the next watering;

Step 8. performing the regulation method continuously for a certain period, e.g., performing once a day, wherein the specific regulation time interval can be set by the user;

Step 9. the monitoring module uploading the pest situation to the platform after a specific time period, and comparing the situation with the former pictures to determine the regulating effect; and Step 10. alerting the user to adopt manual intervention if the effect is not obvious.

Former text describes the intelligent planting system of the present invention in detail, and embodiments constructed by adopting an intelligent planting apparatus of the intelligent planting system will be described below. The entire system can adopt battery, solar/wind energy, ad power supply to provide the energy.

According to the present embodiment, the intelligent planting apparatus is generally composed of an intelligent family starweb (including a plurality of starweb units), an intelligent closed-loop optimization platform, and a client end.

The current automatic watering or planting system is often controlled based on a fixing operation preset before. However, different users have different habits. Some may prefer to control by himself and take everything under his control; some may want to have a personal assistant to constantly remind him; some may tend to follow the expert's advices; and some may wish things to be as simple as possible.

In order to meet requirements of more users, get it used by more people, and better form a scale effect, the system provides four different implementation modes: an expert mode, an assistant mode, a follow mode, and a noob mode.

In the expert mode, one to N environment monitoring modules, 0 to N control systems, and one access module are configured therein. The expert mode gives the user complete control, wherein the expert autonomously controls all details of the planting process, and the system is only responsible for reminding and pre-alerting. When the environmental parameters come to be abnormal, for example, forgetting to water for continuous several days, the system may pre-alert the expert user through the client end to enable the expert user to handle by himself. The expert user can select configuring or not configure the control system. If configuring the control system, the planting management can be remotely controlled by the client end. The closed-loop optimization platform may record the entire planting process, and store the relevant planting data to perform evaluation.

In the assistant mode, one to N environment monitoring modules, one to N control systems, and one access module are configured therein. The assistant mode provides personal assistance to the planting experts or users who are busy. The entire planting process of the user is still based on autonomous control, and the system merely provides early alert and occasional regulation. In general, the user performs planting management by himself, such as, watering and fertilization or the like. When the user forgets the operation or the planting indicator deviates from the threshold, the system issues early alert firstly to remind the user. If the user does not regulate initiatively in a specified time limit, the system may automatically perform the regulation and then inform the user.

In the follow mode, one to N environment monitoring modules, one to N control systems, and one access module are configured therein. At the beginning of the planting, the user selects a trusted expert user whose planting environment is similar to his own through the client end, and grows the planting species same with the expert user. Except operations that must be done manually (e.g., sowing, pruning, harvesting, etc.), other operations, such as watering, fertilization, light compensation, ventilation or the like, in the entire planting process are all automatically performed following the data of the expert. This minimizes the user's operations. And this approach is a process in which the user learns how to plant from the experts. In the process, the user can exchange and discuss with the followed expert user at any time through the client end. The user can also rewind, mark, and add his thoughts to the planting process data through the client end.

In the noob mode, one to N environment monitoring modules, one to N control systems, and one access module are configured therein. Except operations that must be done manually, such as, sowing, pruning, and harvesting or the like, other operations, such as watering, fertilization, light compensation, ventilation or the like, in the entire planting process are all automatically performed according to the planting data preferably selected by the system. This minimizes the noob user's operations.

Figure 4:
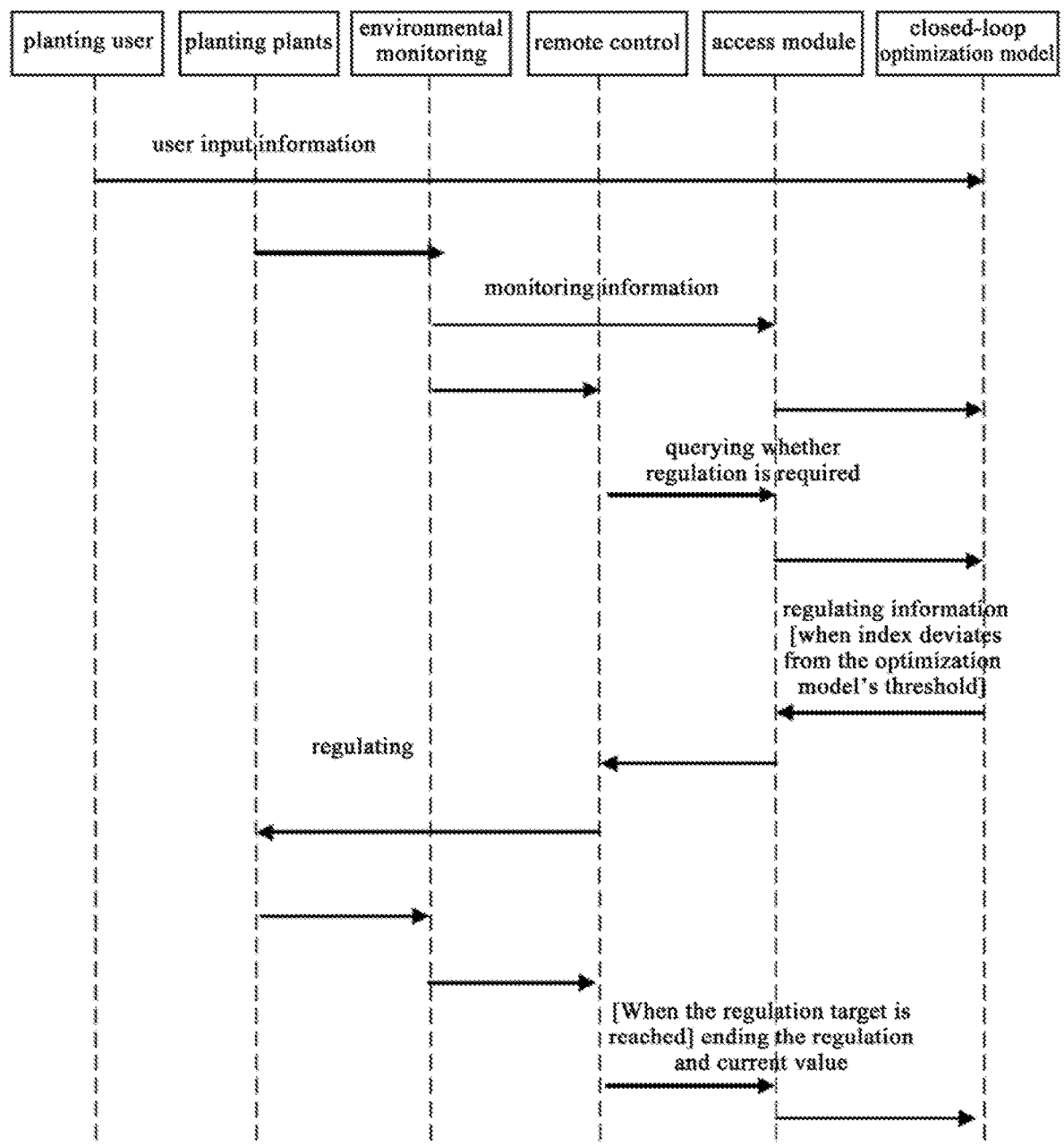
FIG. 4 is a diagram illustrating intelligent planting according to one embodiment of the present invention.

Referring to FIG. 4, it illustrates the outline of the intelligent planting. Step 1: the planting user enters relevant user confirmation information into the closed-loop optimization model, which includes planting information, geographical location information, environment information and the like; Step 2: the monitoring module monitors the plant-related information and transmits it to the access module and the remote control module; Step 3: the access module is responsible for accessing the Internet and transmitting the information to the closed-loop optimization model; Step 4: the remote control module transmits a query that whether there is need for regulation to the closed-loop optimization model through the access module; Step 5: the closed-loop optimization model determines whether it is necessary to regulate according to information, such as, the monitoring information, plant-related information, the last regulate information or the like; Step 6: the closed-loop optimization model generates regulate information as required and transmits it to the remote control module via the access module; Step 7: the remote control module adjusts the plant planting conditions according to the regulate information, such as watering, fertilization and the like; Step 8: the monitoring module transmits the relevant information changes to the remote control module at any time in the regulation process; Step 9: the remote control module determines whether the regulation target is reached; and Step 10: if the regulation target is reached, the regulation will be ended, and the regulation results will be transmitted to the closed-loop optimization model through the access module.

Figure 5:
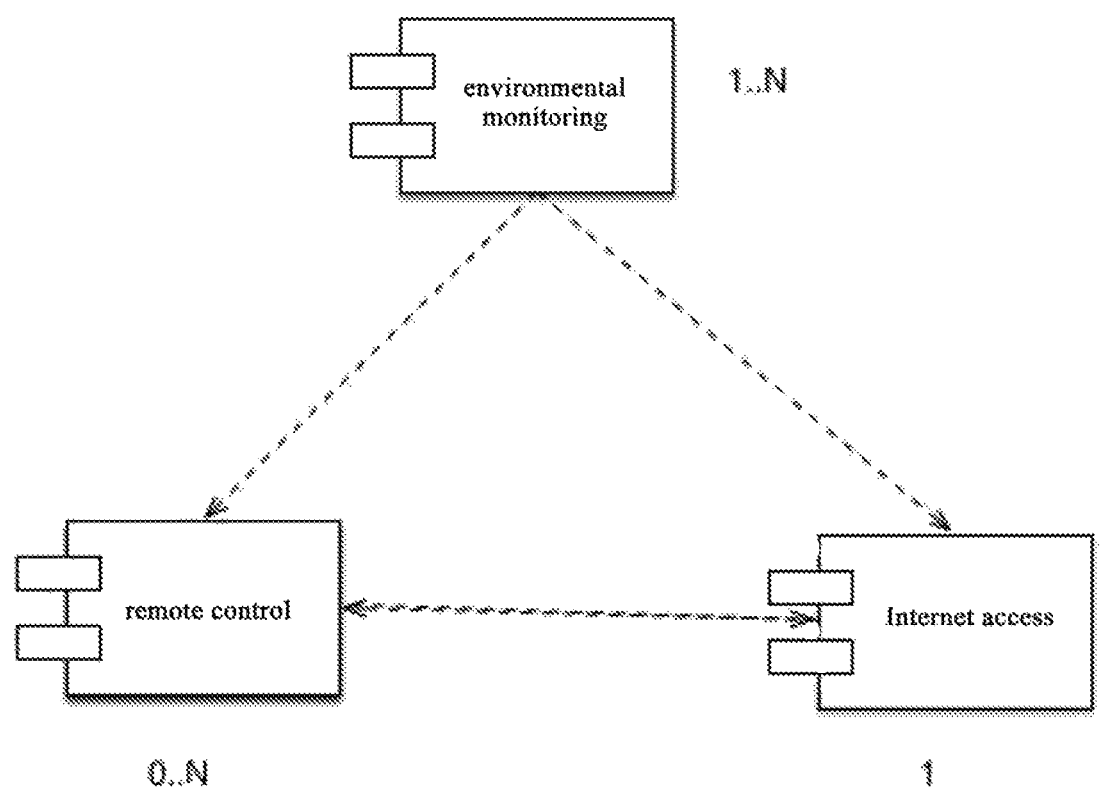
FIG. 5 is a block diagram illustrating the composition of a starweb unit (e.g., a family starweb) according to one embodiment of the present invention.

As illustrated in FIG. 5, a starweb unit includes three portions, which are environmental monitor, control system and Internet access, the portions being connected to each other through a low-power wireless network connection. When the system is implemented, one starweb unit comprises 1 to N environment monitors, 0 to N remote controls, and one Internet access.

In an embodiment of the present invention, the data collection device and the regulation device are disposed in an independent planting environment (for example, in respective houses). In the present invention, this portion may be collectively referred to as an intelligent family starweb, which includes an environment monitoring module, a control system, and an access module.

The access module submits data to the intelligent closed-loop optimization platform (described below) over the Internet and receives the regulation data from the intelligent closed-loop optimization platform. The access module transmits the regulation data to the control system through a low-power wireless connection. The control system performs operations, such as, watering, light compensation/sun shading, oxygen/$CO_2$ compensation, cooling, heating, fertilization, ventilation, pest removing or the like, and compare the environmental monitoring data in real time to see whether the regulation targets are reached or not. A wireless transmission module can organize network by itself and transmit the monitoring data to the control module and the access module.

The measuring device includes various corresponding sensors and the measured information data can then be transmitted or uploaded to the access module through the low-power wireless transmission module, and the access module is responsible for the transmission to the closed-loop optimization platform, such as, to the closed loop optimization platform as described below. The monitoring module can acquire the data at a specified frequency or time interval and then upload the data through the access module. For example, data about temperature, humidity, pictures or the like are uploaded each hour.

Figure 6:
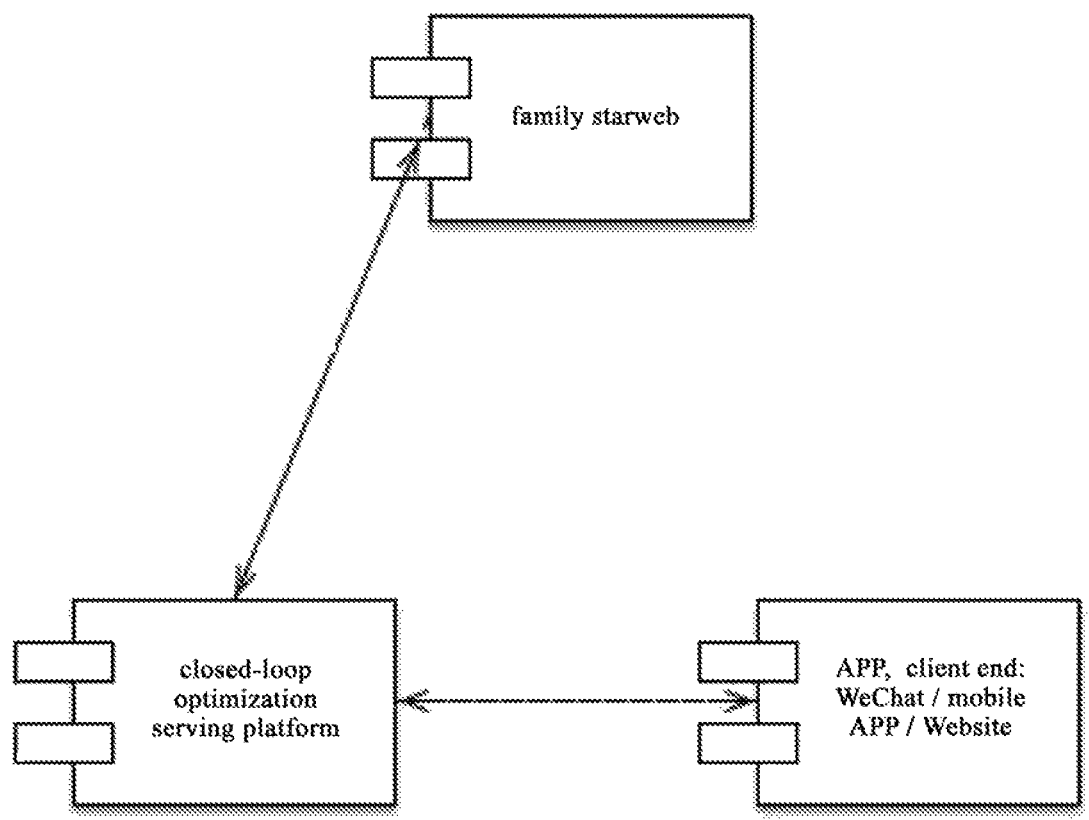
FIG. 6 is a skeleton diagram showing the overall configuration of an intelligent planting system according to one embodiment of the present invention.

As shown in FIG. 6, each user per se forms a starweb unit, and the starweb unit is connected to the closed-loop optimization platform through the Internet. The client end connects to the closed-loop optimization platform through the Internet to acquire information, such as, early alert or current planting situation or the like, and the authenticated starweb unit can be manually controlled through the closed-loop optimization platform.

The user can achieve the following functions using the client end:
  planting guidance during the whole process (including automatic business process guidance and manual guidance);
  remotely observing the environmental data in real time;
  receiving early alert information and reminder of manual intervention;
  uploading captured photos of the plant, sharing the fun of planting, and the harvest situation feedback;
  manually compulsively adjusting plant environmental data: watering, light compensation or the like; and
  querying plant-related knowledge database.

Information entered by the user further includes pre-set watering time and the like. The operation of the user input can be confirmed by the client end at the beginning of planting and entered directly, and then the input information data can be transmitted or uploaded, for example, to be transmitted to the closed-loop optimization platform described below.

Figure 7:
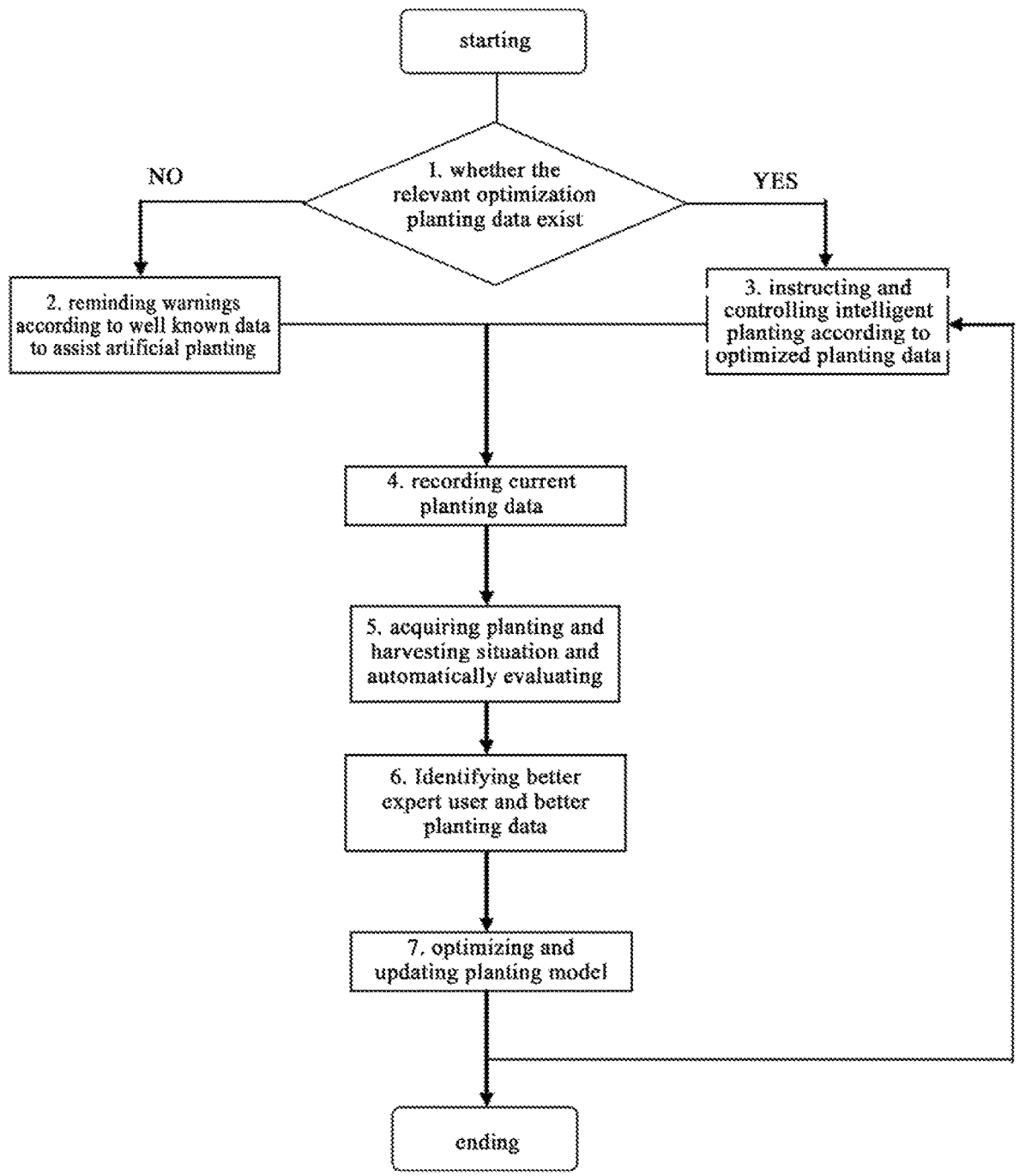
FIG. 7 is a schematic diagram illustrating a closed-loop optimization platform embodiment according to one embodiment of the present invention.

FIG. 7 illustrates an implementation mode of the intelligent closed-loop optimization platform, illustrates how the closed-loop optimization platform forms the entire process of the closed loop and how to instruct the planting process in the closed loop. The classification-marking module and the regulation module are both provided in the intelligent closed-loop optimization platform. The intelligent closed-loop optimization service platform (referred to as the closed-loop optimization platform) matches and selects more preferred environment comparison data and user's possible participation adjustment (an option item) according to the environment data to generate the regulation data, and then transmits the regulation data to the access module through the Internet. The regulation module is configured in the intelligent closed-loop optimization platform and instructs the planting using the better planting data.

Respective upper limit data and lower limit data such as, lighting, temperature or the like, which are well known, are set according to plant species when the closed-loop optimization platform is set up, and the regulation data are feedback in turn. A large amount of user input information and environmental monitoring data in the growth cycle are obtained during the first planting process. During the harvest, users are encouraged to use the client end (WeChat/mobile APP/PC, etc.) to share the harvest by capturing pictures or using the video monitoring information of the system. According to the user planting area and the harvest pictures, the closed-loop optimization platform quantifies the analysis processing. The quantified data are compared to determine the planting data having a better harvest under the same environmental data, which then serves as the regulation instruction data of the next round. This process is automatically cycled and gradually optimized.

Of course, agricultural experts may determine and trim the data as required. Or the planting data of a particular expert under the same environmental data are selected as the comparison object.

Environmental data, planting process and harvest situation serve as the input of the automatic optimization process of the closed-loop optimization platform, and a machine learning algorithm is used to perform classification and optimization to obtain a better planting data model.

Referring to FIG. 7, in step 1, after the user confirms the planting area and the planting species, the system determines whether there is any relevant preferred planting data (the planting data includes the relevant data of each stage during the entire plant growing cycle); Step 2. the system turns to the expert mode if there is no relevant preferred planting data; Step 3. the system uses the preferred data and turning to the noob mode if there is relevant planting data; Step 4. the system records the relevant data of all stages during the entire plant growing cycle; Step 5. the system comprehensively performs scoring at the time of harvest through the user picture sharing, experience sharing, self-evaluation, evaluation from others, video monitoring information and the like; Step 6. the system performs arranging, classification, analysis, and scoring using the machine learning algorithm through the collected large quantity of data, so as to obtain a more professional planting expert, and more preferred planting data, wherein, a part of system users can be selected in this process to perform intervention measures, such that the selection algorithm can be converged more quickly; and Step 7. the system updates data of the closed-loop optimization model; then the system returns to Step 3 when more users plants.

The closed-loop optimization platform consists of two main functions: instructing the planting using the better planting data (regulation processing), and selecting the better planting data from the collected planting data (classification-evaluation processing).

The content of the present invention comprises:

1. An intelligent planting management method, which controls planting processes of plants in a plurality of planting devices placed in different environments, wherein the method includes a data collection step, a data classification-marking step, and a data regulation step, wherein the data collection step comprises:

collecting planting information of plants and information of environments where the planting devices are placed, and sending the information to a data processing system;

collecting at least one planting condition information of a plurality of planting conditions at predetermined time intervals and sending the planting condition information to the data processing system; and collecting plant features of plants, and sending the plant features to the data processing system;

the classification-marking step comprises:

in the data processing system, classifying based on the planting information and the information of environments, scoring based on the plant features of the planting devices and comparing the plant features scores of the plurality of planting devices according to the preset conditions under the same category, marking the planting condition information of the planting device with a high planting feature score, and storing the marked planting condition information under each category related to the plant growth cycle;

the regulation step comprises:

comparing the current planting condition information with the stored marked planting condition information based on the planting information and the information of environment of respective planting device, and when the difference between the former and the latter exceeds a threshold, generating regulation data based on the stored marked planting condition information and the current planting condition information; and sending the regulation data to respective planting device to perform the regulation operation on the planting condition of respective planting device.

2. The intelligent planting management method according to 1, wherein, collecting the plant features of the plants comprises:

in the plant growth cycle, collecting the planting process information of the plants at each stage; and after the harvest, collecting the plant features of the harvested plants, and the classification-marking step comprises:

scoring based on the planting process information and the harvested plant features of respective planting device according to preset conditions under the same category.

3. The intelligent planting management method according to 1, wherein, acquiring the plant features scores of the plurality of planting devices in the current plant growth cycle, and comparing the above scores with the planting feature scores of the stored planting device with a high score. If the former is higher than the latter, marking the respective planting condition information of the current planting device whose plant feature scores is high, and storing the marked planting condition information of each category related to the current plant growth cycle.

4. The intelligent planting management method according to 1, wherein in the first plant growth cycle, comparing the collected current planting condition information with the preset planting condition information, and if the difference between the former and the latter exceeds a threshold, selecting preset planting condition information to generate the regulation data, and sending the regulation data to respective planting device to control the planting condition of respective planting device.

5. The intelligent planting management method according to 1, wherein, the regulation data is obtained based at least one of the following information: stored marked planting condition information, time of the last regulation operation, the last regulation amount, and the threshold.

6. The intelligent planting management method according to 1, wherein the classification-marking step includes cleaning the abnormal data.

7. The intelligent planting management method according to 6, wherein comparing the current planting condition information with the stored marked planting condition information in the regulation step comprises:

fitting curves of the current planting condition information and an expert planting condition information at the same or similar planting time, calculating the difference and derivation of the values at the same time point, in the case that the changing trends are different or the difference exceeds the pre-set value, marking the current planting condition information as mutation data.

8. The intelligent planting management method according to 6, wherein comparing the current planting condition information with the stored marked planting condition information in the regulation step comprises:

fitting curves of the current planting condition information and stored and marked planting condition information at the same or similar planting time point, calculating the difference and derivation of the values at the same time, in the case that the changing trends are different or the difference exceeds the pre-set value, marking the current planting condition information as mutation data.

9. The intelligent planting management method according to 6, wherein deleting the planting condition information which has been marked twice and notifying the system planting experts to perform manual analysis, research and intervention.

10. The intelligent planting management method according to 1, wherein the information of the environment where the planting devices are placed comprises:

address information which is based on the residential area information of the house where the planting devices are placed;

location information which is based on information regarding the house where the planting devices are placed, comprising:

in the case that the planting device is indoors, the floor on which the house is located, the planting device is placed in the room or in an enclosed balcony, the orientation of the room or enclosed balcony, and the daylight-admitting of the window; or in the case that the planting device is outside, the planting device is located in the courtyard, on the terrace, on the roof or on the open balcony.

11. The intelligent planting management method according to 1, wherein the planting information of the plant includes plant species, planting area, planting time, and soil information.

12. The intelligent planting management method according to 11, wherein the soil information comprises a type of soil matrix, a type of a base fertilizer, a mixing ratio of the soil matrix and the base fertilizer, a soil pH, and a soil conductivity.

13. The intelligent planting management method according to 2, wherein the planting process information comprises one or more of the following groups:
germination success rate, which is based on germination number and planting area;
germination time, which is based on the germination cut-off time and sowing time;
health status of a leaf's growing;
status of diseases, pests;
plant seedling height and leaf area; and
management process information, including watering management, temperature control management, diseases and pest management, seedling pruning and pollination management.

14. The intelligent planting management method according to 2, wherein the plant feature of the harvested plants comprises one or more of the following groups:
the harvest situation per planting area;
an amount of fruit per planting area;
florescence of plants; and
the planter's subjective evaluation which includes self-evaluation of growth process, self-evaluation of harvesting situation, taste evaluation of fruits/leafy vegetables, and evaluation of ornamental plants.

15. The intelligent planting management method according to 1, wherein the planting condition includes rainfall amount, air condition, soil condition and light condition.

16. The intelligent planting management method according to 15, wherein the air condition is selected from one or more of the following groups: air temperature, air humidity, ventilation, oxygen content, carbon dioxide content, harmful gas content and inhalable particle.

17. The intelligent planting management method according to 16, wherein the harmful gas is one or more of formaldehyde, benzene, radon, ammonia, volatile organic compounds and sulfur dioxide.

18. The intelligent planting management method according to 16, wherein the inhalable particles are PM10, PM2.5, or both of PM10 and PM2.5.

19. The intelligent planting management method according to 15, wherein the soil condition is selected from one or more of the groups consisting of soil pH, soil conductivity, soil temperature and soil moisture.

20. The intelligent planting management method according to 15, wherein the light condition is selected from one or more of the following groups: light intensity and light duration.

21. The intelligent planting management method according to 1, wherein collecting the plant features further comprises taking a photo or video.

22. The intelligent planting management method according to 1, wherein the regulation operation is selected from one or more of the following groups: watering, light compensation, sunshading, supplementing oxygen, supplementing carbon dioxide, lowering temperature, increasing temperature, fertilizing, increasing ventilation, reducing ventilation, spraying insecticides, and spraying pest control preventing agents.

23. An intelligent planting apparatus, which controls planting processes of plants in a plurality of planting devices placed in different environments, including a data collection device, a classification-marking device and a regulation device, wherein
the data collection device collects the planting information of the plants and the information of the environments where the planting devices are placed, collects at least one planting condition information of the plurality of planting conditions at predetermined time intervals, and sends the collected information to the classification-marking device;
the classification-marking device classifies the received information based on the planting information and the information of the environments, scores the plant features of the planting devices, according to a preset condition under the same category, compares the plant feature scores of a plurality of planting devices, marks respective planting condition information of the planting device having a high plant feature score within the plant growth cycle, and stores the marked planting condition information under each category related to the plant growth cycle;
the regulation device compares the current planting condition information with the stored marked planting condition information based on the planting information and the information of environment of respective planting device, and when the difference between the former and the latter exceeds the threshold, the regulation device generates a regulation data based on the stored marked planting condition information and the current planting condition information, and the regulation device sends the regulation data to respective planting device for performing the regulation operation on the planting condition information of respective planting device.

24. The intelligent planting apparatus according to 23, wherein
collecting the plant features of the plants comprises:
in the planting growing cycle, collecting the planting process information on the plants at each stage; and
after harvesting, collecting plant features of the harvested plants, and
the classification-marking device scoring the planting process information and the harvested plant features of respective planting device according to preset conditions under the same category.

25. The intelligent planting apparatus according to 23, wherein, acquiring the plant features of the plurality of planting devices in the current plant growth cycle, and comparing the above scores with the planting feature scores of the stored planting device with a high score, if the former is higher than the latter, marking the current planting condition information of the planting device whose plant feature is high, and storing the marked planting condition information of each category related to the current plant growth cycle.

26. The intelligent planting apparatus according to 23, wherein in the first plant growth cycle, comparing the collected current planting condition information with the preset planting condition information, and if the difference between the former and the latter exceeds a threshold, selecting preset planting condition information to generate the regulation data, and sending the regulation data to respective planting device to control the planting condition of respective planting device.

27. The intelligent planting apparatus according to 23, wherein
the regulation data is obtained based at least one of the following information: stored marked planting condition information, time of the last regulation operation, the last regulation amount, and the threshold.

28. The intelligent planting apparatus according to 23, wherein the classification-marking device includes cleaning the abnormal data.

29. The intelligent planting apparatus according to 28, wherein comparing the current planting condition information with the stored marked planting condition information in the regulation step comprises:

fitting curves of the current planting condition information and an expert planting condition information at the same or similar planting time, calculating the difference and derivation of the values at the same time, in the case that the changing trends are different or the difference exceeds the pre-set value, marking the current planting condition information as mutation data.

30. The intelligent planting apparatus according to 28, wherein comparing the current planting condition information with the stored marked planting condition information in the regulation step comprises:

fitting curves of the current planting condition information and stored and marked planting information at the same or similar planting time, calculating the difference and derivation of the values at the same time, in the case that the changing trends are different or the difference exceeds the pre-set value, marking the current planting condition information as mutation data.

31. The intelligent planting apparatus according to 28, wherein deleting the planting condition information which has been marked twice and notifying the system planting experts to perform manual analysis, research and intervention.

32. The intelligent planting apparatus according to 1, wherein the information of the environment where the planting devices are placed comprises:

address information which is based on the residential area information of the house where the planting devices are placed;

location information which is based on information regarding the house where the planting devices are placed, comprising:

in the case that the planting device is indoors, the floor on which the building is located, whether the planting device is placed in the room or in an enclosed balcony, the orientation of the room or enclosed balcony, and the daylight-admitting of the window; or in the case that the plant is outside, whether the plant is located on the courtyard, on the terrace, on the roof or on the open balcony.

33. The intelligent planting apparatus according to 23, wherein the planting information of the plant includes plant species, planting area, planting time, and soil information.

34. The intelligent planting apparatus according to 33, wherein the soil information comprises a type of soil matrix, a type of a base fertilizer, a mixing ratio of a soil matrix and a base fertilizer, a soil pH, and a soil conductivity.

35. The intelligent planting apparatus according to 24, wherein the planting process information comprises one or more of the following groups:

germination success rate, which is based on germination number and planting area;

germination time, which is based on the germination cut-off time and sowing time;

health status of a leaf's growing;

status of diseases, pests;

plant seedling height and leaf area; and management process information, including watering management, temperature control management, diseases and pest management, seedling pruning and pollination management.

36. The intelligent planting apparatus according to 24, wherein the plant feature of the harvested plants comprises one or more of the following groups:

the harvest situation per planting area;

an amount of fruit per planting area;

florescence of plants; and the planter's subjective evaluation which includes self-evaluation of growth process, self-evaluation of harvesting situation, taste evaluation of fruits/leafy vegetables, and evaluation of ornamental plants.

37. The intelligent planting apparatus according to 23, wherein the planting condition includes rainfall amount, air condition, soil condition and light condition.

38. The intelligent planting apparatus according to 37, wherein the air condition is selected from one or more of the following groups: air temperature, air humidity, ventilation, oxygen content, carbon dioxide content, harmful gas content and inhalable particle.

39. The intelligent planting apparatus according to 38, wherein the harmful gas is one or more of formaldehyde, benzene, radon, ammonia, volatile organic compounds and sulfur dioxide.

40. The intelligent planting apparatus according to 38, wherein the inhalable particles are PM10, PM2.5, or both of PM10 and PM2.5.

41. The intelligent planting apparatus according to 37, wherein the soil condition is selected from one or more of the groups consisting of soil pH, soil conductivity, soil temperature and soil moisture.

42. The intelligent planting apparatus according to 37, wherein the light conditions are selected from one or more of the following groups: light intensity and light duration.

43. The intelligent planting apparatus according to 23, wherein collecting the plant features further comprises taking a photo or video.

44. The intelligent planting apparatus according to 23, wherein the regulation operation is selected from one or more of the following groups: watering, light compensation, sunshading, supplementing oxygen, supplementing carbon dioxide, lowering temperature, increasing temperature, fertilizing, increasing ventilation, reducing ventilation, spraying insecticides, and spraying pest control preventing agents.

45. An intelligent planting apparatus, comprising a client end, a starweb formed by a plurality of starweb units, and a closed-loop optimization platform, wherein the client end is connected to the closed-loop optimization platform through the Internet, acquires information such as pre-warnings, current planting conditions, and the like, and can manually control each starweb unit through a closed-loop optimization platform;

the starweb unit and the closed-loop optimization platform are connected through the Internet, and each starweb unit includes a measurement device, a control device and an Internet access module, wherein the measurement means measures information of environment and planting condition information of the planting device of the plants, then sends the measured data to the access module, the access module submits the information data to the closed-loop optimization platform via the Internet and receives the regulation data from the closed-loop optimization platform, and the control device controls the planting conditions of the planting device according to the regulation data;

the closed-loop optimization platform receives information data from each starweb unit, classifies the received information based on the planting information and the information of environment, scores based on the plant features of the planting devices, according to a preset condition under the same category, compares the plant feature scores of a plurality of planting devices, marks respective planting condition information of the planting devices having a high plant feature score within the plant growth cycle, and stores the marked planting condition information under each category related to the plant growth cycle, wherein the closed-loop optimization platform compares the current planting condition information with the stored marked planting condition information according to the planting information and the information of environment of respective planting device, and when the difference between the former and the latter exceeds the threshold, generates the regulation data according to the marked planting condition information and the current planting condition information, and sends the regulation data to each of the starweb units so as to perform the regulation operation on the planting conditions of the planting devices of each starweb unit.

46. The intelligent planting apparatus according to 45, wherein collecting the plant features of the plants comprises:

in the plant growth cycle, collecting the planting process information of the plants at each stage; and after the harvest, collecting the plant features of the harvested plants, and the closed-loop optimization platform scoring based on the planting process information and the harvested plant features of respective planting device according to preset conditions under the same category.

47. The intelligent planting management method according to 45, wherein, acquiring the plant features of the plurality of planting devices in the current plant growth cycle, and comparing the above scores with the planting feature scores of the stored planting device with a high score. If the former is higher than the latter, marking the current planting condition information of the planting device whose plant feature is high, and storing the marked planting condition information of each category related to the current plant growth cycle.

48. The intelligent planting apparatus according to 45, wherein in the first plant growth cycle, the closed-loop optimization platform compares the collected current planting condition information with the preset planting condition information, and when the difference between the former and the latter exceeds a threshold, the preset planting condition information is selected to generate regulation data, and the regulation data is sent to respective planting device to control the planting condition of respective planting device.

49. The intelligent planting apparatus according to 45, wherein the regulation data is obtained based at least one of the following information: stored marked planting condition information, time of the last regulation operation, the last regulation amount, and the threshold.

50. The intelligent planting apparatus according to 45, wherein the closed-loop optimization platform cleans the abnormal data.

51. The intelligent planting apparatus according to 50, wherein comparing the current planting condition information with the stored marked planting condition information in the regulation step comprises:

fitting curves of the current planting condition information and an expert planting condition information at the same or similar planting time, calculating the difference and derivation of the values at the same time, in the case that the changing trends are different or the difference exceeds the pre-set value, marking the current planting condition information as mutation data.

52. The intelligent planting apparatus according to 50, wherein comparing the current planting condition information with the stored marked planting condition information in the regulation step comprises:

fitting curves of the current planting condition information and stored and marked planting information at the same or similar planting time, calculating the difference and derivation of the values at the same time, in the case that the changing trends are different or the difference exceeds the pre-set value, marking the current planting condition information as mutation data.

53. The intelligent planting apparatus according to 50, wherein deleting the planting condition information which has been marked twice and notifying the system planting experts to perform manual analysis, research and intervention.

54. The intelligent planting apparatus according to 45, wherein the information of the environment where the planting devices are placed comprises:

address information which is based on the residential area information of the house where the planting devices are placed;

location information which is based on information regarding the house where the planting devices are placed, comprising:

in the case that the planting apparatus is indoors, the floor on which the building is located, whether the planting apparatus is placed in the room or in an enclosed balcony, the orientation of the room or enclosed balcony, and the daylight-admitting of the window; or in the case that the plant is outside, whether the plant is located on the courtyard, on the terrace, on the roof or on the open balcony.

55. The intelligent planting apparatus according to 45, wherein the planting information of the plant includes plant species, planting area, planting time, and soil information.

56. The intelligent planting apparatus according to 55, wherein the soil information comprises a type of soil matrix, a type of a base fertilizer, a mixing ratio of a soil matrix and a base fertilizer, a soil pH, and a soil conductivity.

57. The intelligent planting apparatus according to 46, wherein the planting process information comprises one or more of the following groups:

germination success rate, which is based on germination number and planting area;

germination time, which is based on the germination cut-off time and sowing time;

health status of a leaf's growing;

status of diseases, pests;

plant seedling height and leaf area; and management process information, including watering management, temperature control management, diseases and pest management, seedling pruning and pollination management.

58. The intelligent planting apparatus according to 46, wherein the plant feature of the harvested plants comprises one or more of the following groups:

the harvest situation per planting area;

an amount of fruit per planting area;

florescence of plants; and the planter's subjective evaluation which includes self-evaluation of growth process, self-evaluation of harvesting situation, taste evaluation of fruits/leafy vegetables, and evaluation of ornamental plants.

59. The intelligent planting apparatus according to 45, wherein the planting condition includes rainfall amount, air condition, soil condition and light condition.

60. The intelligent planting apparatus according to 59, wherein the air condition is selected from one or more of the following groups: air temperature, air humidity, ventilation, oxygen content, carbon dioxide content, harmful gas content and inhalable particle.

61. The intelligent planting apparatus according to 60, wherein the harmful gas is one or more of formaldehyde, benzene, radon, ammonia, volatile organic compounds and sulfur dioxide.

62. The intelligent planting apparatus according to 60, wherein the inhalable particles are PM10, PM2.5, or both of PM10 and PM2.5.

63. The intelligent planting apparatus according to 59, wherein the soil condition is selected from one or more of the groups consisting of soil pH, soil conductivity, soil temperature and soil moisture.

64. The intelligent planting apparatus according to 59, wherein the light conditions are selected from one or more of the following groups: light intensity and light duration.

65. The intelligent planting apparatus according to 45, wherein collecting the plant features further comprises taking a photo or video.

66. The intelligent planting apparatus according to 45, wherein the regulation operation is selected from one or more of the following groups: watering, light compensation, sunshading, supplementing oxygen, supplementing carbon dioxide, lowering temperature, increasing temperature, fertilizing, increasing ventilation, reducing ventilation, spraying insecticides, and spraying pest control preventing agents.

While the present invention have been described in terms of preferred embodiments, it is to be understood that the invention is not limited to the disclosed exemplary embodiments, but may cover various modifications and equivalents falling within the scope of the invention as expressed in the appended claims.

The invention claimed is:

1. A planting management method, which controls planting processes of plants in a plurality of planting devices placed in different environments, wherein the method includes a data collection step, a classification-marking step, and a regulation step, wherein
   the data collection step comprises:
      collecting planting information of plants and information of environments where the planting devices are placed, and sending the information to a data processing system;
      collecting at least one planting condition information of a plurality of planting conditions at predetermined time intervals and sending the planting condition information to the data processing system; and
      collecting plant features of plants, and sending the plant features to the data processing system;
   the classification-marking step comprises:
      in the data processing system, classifying based on the planting information and the information of environments, scoring based on the plant features in the planting devices and comparing the plant features scores of the plurality of planting devices according to preset conditions under a same category, marking each of the planting condition information of the planting device with a higher planting feature score, and storing the marked planting condition information under each category related to the plant growth cycle;
   the regulation step comprises:
      comparing the current planting condition information with the stored marked planting condition information based on the planting information and the information of environment of respective planting device, and when the difference between the former and the latter exceeds a threshold, generating regulation data based on the stored marked planting condition information and the current planting condition information; and
      sending the regulation data to respective planting device to perform the regulation operation on the planting condition of respective planting device,
   wherein the information of the environment where the planting devices are placed comprises:
      address information which is based on the residential area information of the house where the planting devices are placed;
      location information which is based on information regarding the house where the planting devices are placed, comprising:
         in the case that the planting device is indoors, the floor on which the house is located, the planting device is placed in the room or in an enclosed balcony, the orientation of the room or enclosed balcony, and the daylight-admitting of the window; or
         in the case that the planting device is outside, the planting device is located in the courtyard, on the terrace, on the roof, or on the open balcony.

2. The planting management method according to claim 1, wherein,
   collecting the plant features of the plants comprises:
      in the plant growth cycle, collecting the planting process information of the plants at each stage; and
      after the harvest, collecting the plant features of the harvested plants, and
   the classification-marking step comprises:
      scoring based on the planting process information and the harvested plant features of respective planting device according to preset conditions under the same category.

3. The planting management method according to claim 2, wherein the planting process information comprises one or more of the groups comprising followings:
   germination success rate, which is based on germination number and planting area;
   germination time, which is based on the germination cut-off time and sowing time;
   health status of leaf's growing;
   status of diseases, pests;
   plant seedling height and leaf area; and
   management process information, including watering management, temperature control management, diseases and pest management, seedling pruning and pollination management.

4. The planting management method according to claim 2, wherein the plant feature of the harvested plants comprises one or more of the groups comprising:
   the harvest situation per planting area;
   an amount of fruit per planting area;
   florescence of plants; and
   the planter's subjective evaluation which includes self-evaluation of growth process, self-evaluation of harvesting situation, taste evaluation of fruits/leafy vegetables, and evaluation of ornamental plants.

5. The planting management method according to claim 1, wherein, acquiring the plant features scores of the plurality of planting devices in the current plant growth cycle, and comparing the above scores with the planting feature scores of the stored planting device with the higher planting feature score, if the former is higher than the latter, marking the respective planting condition information of the current planting device whose plant feature scores is higher, and storing the marked planting condition information of each category related to the current plant growth cycle.

6. The planting management method according to claim 1, wherein in the first plant growth cycle, comparing the collected current planting condition information with the preset planting condition information, and if the difference between the former and the latter exceeds a threshold, selecting preset planting condition information to generate the regulation data, and sending the regulation data to respective planting device to control the planting condition of respective planting device.

7. The planting management method according to claim 1, wherein
the regulation data is obtained based at least one of the followings: stored marked planting condition information, time of the last regulation operation, the last regulation amount, and the threshold.

8. The planting management method according to claim 1, wherein the classification-marking step includes cleaning the abnormal data.

9. The planting management method according to claim 8, wherein comparing the current planting condition information with the stored marked planting condition information in the regulation step comprises:
fitting curves of the current planting condition information and an expert planting condition information at the same or similar planting time, calculating the difference and derivation of the values at the same time point, in the case that the changing trends are different or the difference exceeds the pre-set value, marking the current planting condition information as mutation data.

10. The planting management method according to claim 8, wherein comparing the current planting condition information with the stored marked planting condition information in the regulation step comprises:
fitting curves of the current planting condition information and stored and marked planting condition information at the same or similar planting time, calculating the difference and derivation of the values at the same time point, in the case that the changing trends are different or the difference exceeds the pre-set value, marking the current planting condition information as mutation data.

11. The planting management method according to claim 8, wherein deleting the planting condition information which has been marked twice and notifying the system planting experts to perform manual analysis, research and intervention.

12. The planting management method according to claim 1, wherein the planting information of the plant includes plant species, planting area, planting time, and soil information.

13. The planting management method according to claim 12, wherein the soil information comprises a type of soil matrix, a type of a base fertilizer, a mixing ratio of the soil matrix and the base fertilizer, a soil pH, and a soil conductivity.

14. The planting management method according to claim 1, wherein the planting condition includes rainfall amount, air condition, soil condition and light condition.

15. The planting management method according to claim 14, wherein the air condition is selected from one or more of the groups comprising: air temperature, air humidity, ventilation, oxygen content, carbon dioxide content, harmful gas content and inhalable particle.

16. The planting management method according to claim 15, wherein the harmful gas is one or more of formaldehyde, benzene, radon, ammonia, volatile organic compounds and sulfur dioxide.

17. The planting management method according to claim 15, wherein the inhalable particles are PM10, PM2.5, or both of PM10 and PM2.5.

18. The planting management method according to claim 14, wherein the soil condition is selected from one or more of the groups consisting of soil pH, soil conductivity, soil temperature and soil moisture.

19. The planting management method according to claim 14, wherein the light condition is selected from one or more of the groups consisting of: light intensity and light duration.

20. The management method of claim 1, wherein collecting the plant features further comprises taking a photo or video.

21. The management method of claim 1, wherein the regulation operation is selected from one or more of the groups comprising: watering, light compensation, sunshading, supplementing oxygen, supplementing carbon dioxide, lowering temperature, increasing temperature, fertilizing, increasing ventilation, reducing ventilation, spraying insecticides, and spraying pest preventing agents.

22. A planting apparatus, which controls planting processes of plants in a plurality of planting devices placed in different environments, including a data collection device, a classification-marking device and a regulation device, wherein
the data collection device collects the planting information of the plants and the information of the environments where the planting devices are placed, collects at least one planting condition information of a plurality of planting conditions at predetermined time intervals, and sends the collected information to the classification-marking device;
the classification-marking device classifies the received information based on the planting information and the information of the environments, scores the plant features of the planting devices, according to a preset condition under the same category, compares the plant feature scores of a plurality of planting devices, marks respective planting condition information of the planting device having a higher plant feature score within the plant growth cycle, and stores the marked planting condition information under each category related to the plant growth cycle;
the regulation device compares the current planting condition information with the stored marked planting condition information based on the planting information and the information of environment of respective planting device, and when the difference between the former and the latter exceeds a threshold, the regulation device generates a regulation data based on the stored marked planting condition information and the current planting condition information, and the regulation device sends the regulation data to respective planting device so as to perform a regulation operation on the planting condition information of respective planting device, wherein the information of the environment where the planting devices are placed comprises:

address information which is based on the residential area information of the house where the planting devices are placed;

location information which is based on information regarding the house where the planting devices are placed, comprising:
in the case that the planting device is indoors, the floor on which the house is located, the planting device is placed in the room or in an enclosed balcony, the orientation of the room or enclosed balcony, and the daylight-admitting of the window; or
in the case that the planting device is outside, the planting device is located in the courtyard, on the terrace, on the roof or on the open balcony.

23. The planting apparatus of claim 22, wherein collecting the planting features of the plants includes:
during the plant growing cycle, collecting information of the planting process at each stage of the plants; and
after harvesting, collecting plant features of the harvested plants, and
the classification-marking device scoring the planting process information and the harvested plant features of respective planting device according to preset conditions under the same category.

24. The planting apparatus according to claim 22, wherein the plant feature scores of the plurality of planting devices under the current plant growing cycle are acquired and compared with the stored plant feature scores of the planting device with the higher planting feature score, in the case that the former is higher than the latter, respective planting condition information of the planting device whose current plant feature score is higher is marked, and the marked planting condition information of each category related to the current plant growing cycle is stored.

25. The planting apparatus according to claim 22, wherein in the first plant growing cycle, the collected current planting condition information is compared with the preset planting condition information, and if the difference between the former and the latter exceeds a threshold, the preset planting condition information is selected to generate a regulation data, and the regulation data is sent to respective planting device to control the planting condition of respective planting device.

26. A planting apparatus, comprising a client end, a starweb formed by a plurality of starweb units, and a closed-loop optimization platform, wherein
the client end is connected to the closed-loop optimization platform through the Internet, acquires information such as pre-warnings, current planting conditions, and can manually control each starweb unit through the closed-loop optimization platform,
the starweb unit and the closed-loop optimization platform are connected through the Internet, and each starweb unit includes a measurement device, a control device and an Internet access module, wherein the measurement device measures information of environment information and planting condition information of the planting device of the plants, then sends the measured information data to the access module, the access module submits the information data to the closed-loop optimization platform via the Internet and receives the regulation data from the closed-loop optimization platform, and the control device controls the planting conditions of the planting device according to the regulation data, the closed-loop optimization platform receives information data from each starweb unit, classifies the received information based on the planting information and the information of environment, scores the plant features of the respective planting devices, according to a preset condition under the same category, compares the plant feature scores of a plurality of planting devices, marks respective planting condition information of the planting devices having a higher plant feature score within the plant growing cycle, and stores the marked planting condition information under each category related to the plant growing cycle, wherein the closed-loop optimization platform compares the current planting condition information with the stored marked planting condition information according to the planting information and the information of environment of respective planting device, and when the difference between the former and the latter exceeds a threshold, generates a regulation data according to the stored marked planting condition information and the current planting condition information, and sends the regulation data to each of the starweb units so as to perform regulation operation on the planting condition of the planting devices of each starweb unit, wherein the information of the environment where the planting devices are placed comprises:

address information which is based on the residential area information of the house where the planting devices are placed;

location information which is based on information regarding the house where the planting devices are placed, comprising:
in the case that the planting device is indoors, the floor on which the house is located, the planting device is placed in the room or in an enclosed balcony, the orientation of the room or enclosed balcony, and the daylight-admitting of the window; or
in the case that the planting device is outside, the planting device is located in the courtyard, on the terrace, on the roof, or on the open balcony.

27. The planting apparatus according to claim 26, wherein collecting planting features of the plants includes:
during the plant growing cycle, collecting information on the planting process at each stage of the plants; and
after harvesting, collecting the plant features of the harvested plants, and
the closed-loop optimization platform scores the planting process information and the harvested plant features of respective planting device according to preset conditions under the same category.

28. The planting apparatus according to claim 26, wherein plant feature scores of a plurality of planting devices in the current plant growing cycle are acquired and compared with the stored plant feature scores of the planting devices with the higher planting feature score, if the former is higher than the latter, respective planting condition information of the planting device whose current plant feature score is higher is marked, and the marked planting condition information under each category related to the current plant growing cycle is stored.

29. The planting apparatus according to claim 26, wherein in the first plant growing cycle, the closed-loop optimization platform compares the collected current planting condition information with the preset planting condition information, and when the difference between the former and the latter exceeds a threshold, the preset planting condition information is selected to generate regulation data, and the regulation data is sent to the respective planting devices to control the planting condition of the respective planting device.

* * * * *